United States Patent
O'Connor et al.

(10) Patent No.: US 12,493,505 B2
(45) Date of Patent: Dec. 9, 2025

(54) SYSTEMS AND METHODS FOR DATA LINEAGE-BASED SYSTEM ANOMALY DETECTION

(71) Applicant: Capital One Services, LLC, McLean, VA (US)

(72) Inventors: Thomas J. O'Connor, San Francisco, CA (US); Jon Stofer, Saratoga, CA (US); William Ye, San Francisco, CA (US); Jose Moreno, Berkeley, CA (US); Samuel Joshua Bennett, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 197 days.

(21) Appl. No.: 18/531,290

(22) Filed: Dec. 6, 2023

(65) Prior Publication Data

US 2025/0190291 A1    Jun. 12, 2025

(51) Int. Cl.
*G06F 16/20* (2019.01)
*G06F 11/07* (2006.01)
*G06F 16/23* (2019.01)

(52) U.S. Cl.
CPC ...... *G06F 11/0751* (2013.01); *G06F 16/2365* (2019.01)

(58) Field of Classification Search
CPC ............. G06F 11/0751; G06F 16/2365
See application file for complete search history.

(56) References Cited

U.S. PATENT DOCUMENTS

| | | | |
|---|---|---|---|
| 9,659,042 | B2 | 5/2017 | Puri et al. |
| 10,025,878 | B1 * | 7/2018 | Lefever ............... G06F 16/9024 |
| 10,776,196 | B2 | 9/2020 | Ohana et al. |
| 12,242,441 | B1 * | 3/2025 | Feng .................... G06F 16/2365 |
| 2013/0332423 | A1 * | 12/2013 | Puri ........................ G06F 16/35 |
| | | | 707/687 |
| 2016/0357957 | A1 * | 12/2016 | Deen ................. G06F 16/24578 |
| 2019/0081876 | A1 | 3/2019 | Ghare et al. |
| 2019/0324831 | A1 | 10/2019 | Gu |
| 2020/0042965 | A1 * | 2/2020 | Ganesan ............. G06Q 20/3825 |
| 2022/0342869 | A1 * | 10/2022 | Chandrahasan ...... G06F 16/221 |
| 2022/0350789 | A1 * | 11/2022 | Yang .................... G06F 16/2365 |

* cited by examiner

*Primary Examiner* — Mahesh H Dwivedi
(74) *Attorney, Agent, or Firm* — Greenberg Traurig, LLP

(57) ABSTRACT

Systems and methods of the present disclosure enable anomaly detection based on data lineage by using at least one processor to receive initial lineage records that record initial changes in data items at each data processor of a lineage stream. The processor(s) generates a historical distribution as a data processor baseline for a particular data processor based on each change in each data item at the particular data processor. For lineage records in a subsequent time period, the processor(s) identifies subsequent changes in data items at the particular data processor and generates a real-time dynamic distribution to represent a current data processor behavior for the particular data processor based on each change for the subsequent lineage records. The processor(s) determines a deviation between the data processor baseline and the current data processor behavior based on the historical distribution and the real-time dynamic distribution to identify a data processor anomaly.

20 Claims, 8 Drawing Sheets

SYSTEMS AND METHODS FOR DATA LINEAGE-BASED SYSTEM ANOMALY DETECTION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to systems and methods for lineage stream analysis for proactive detection of anomaly injection into lineage streams for lineage-based system anomaly detection.

BACKGROUND OF TECHNOLOGY

Anomaly detection typically relies on analyzing a data item in the context of related data items to determine whether the data item is outside of the norm. Sometimes, data lineage analysis can be used to identify a root cause of anomalous data item after the anomalous data item has been detected.

SUMMARY OF DESCRIBED SUBJECT MATTER

In some aspects, the techniques described herein relate to a method including: receiving, by at least one processor, in real time, a plurality of initial lineage records that records a plurality of initial changes in a plurality of data items at each data processor of a plurality of data processors of a lineage stream over an initial time period; where the plurality of data processors relate to a plurality of processes performed on the plurality of data items during the initial time period; generating, by the at least one processor, at least one historical distribution as a data processor baseline for a particular data processor in the plurality of data processors based on a magnitude of each change associated with the particular data processor in each historical data item of a plurality of historical lineage records; receiving, by at least one processor, in real time, a plurality of lineage records that records a plurality of subsequent changes in the plurality of data items at each data processor of the plurality of data processors of the lineage stream over a subsequent time period; generating, by the at least one processor, a real-time dynamic distribution to represent a current data processor behavior for the particular data processor in the plurality of data processors based on the magnitude of each change associated with the particular data processor in each data item of the plurality of subsequent lineage records; determining, by the at least one processor, a deviation between the data processor baseline and the current data processor behavior based on the at least one historical distribution and the real-time dynamic distribution; determining, by the at least one processor, at least one data processor anomaly associated with the particular data processor based at least in part on the deviation and a predetermined deviation threshold; and generating, by the at least one processor, a user interface (UI) depicting a map of the lineage stream, where the UI is configured to label at least one data processor as the at least one data processor anomaly in the map so as to allow at least one action to affect the at least one data processor anomaly.

In some aspects, the techniques described herein relate to a method, where the plurality of data processors is specific to the lineage stream.

In some aspects, the techniques described herein relate to a method, where the plurality of data processors is shared across a plurality of lineage streams; and where the at least one historical distribution is associated with the particular data processor for the lineage stream.

In some aspects, the techniques described herein relate to a method, further including: generating, by the at least one processor, at least one change quantification for each initial change of the plurality of initial changes based at least in part on a numerical encoding of at least one character in the plurality of data items.

In some aspects, the techniques described herein relate to a method, where the plurality of initial lineage records is recorded in metadata of the plurality of data items.

In some aspects, the techniques described herein relate to a method, further including: generating, by the at least one processor, the real-time dynamic distribution to represent the current data processor behavior for the particular data processor in the plurality of data processors based on the plurality of subsequent lineage records associated with a current period of time; where the current period of time includes a most recent day.

In some aspects, the techniques described herein relate to a method, where the at least one historical distribution includes at least one Gaussian distribution.

In some aspects, the techniques described herein relate to a method, where the at least one Gaussian distribution includes a compound Gaussian distribution.

In some aspects, the techniques described herein relate to a system including: at least one processor in communication with a non-transitory computer readable medium having software instructions stored thereon, where the at least one processor, upon execution of the software instructions, is configured to: receive in real time, a plurality of initial lineage records that records a plurality of initial changes in a plurality of data items at each data processor of a plurality of data processors of a lineage stream over an initial time period; where the plurality of data processors relate to a plurality of processes performed on the plurality of data items during the initial time period; generate at least one historical distribution as a data processor baseline for a particular data processor in the plurality of data processors based on a magnitude of each change associated with the particular data processor in each historical data item of a plurality of historical lineage records; receive in real time, a plurality of lineage records that records a plurality of subsequent changes in the plurality of data items at each data processor of the plurality of data processors of the lineage stream over a subsequent time period; generate a real-time dynamic distribution to represent a current data processor behavior for the particular data processor in the plurality of data processors based on the magnitude of each change associated with the particular data processor in each data item of the plurality of subsequent lineage records; determine a deviation between the data processor baseline and the current data processor behavior based on the at least one historical distribution and the real-time dynamic distribution; determine at least one data processor anomaly associated with the particular data processor based at least in part on the deviation and a predetermined deviation threshold; and generate a user interface (UI) depicting a map of the lineage stream, where the UI is configured to label at least one data processor as the at least one data processor anomaly in the map so as to allow at least one action to affect the at least one data processor anomaly.

In some aspects, the techniques described herein relate to a system, where the plurality of data processors is specific to the lineage stream.

In some aspects, the techniques described herein relate to a system, where the plurality of data processors is shared across a plurality of lineage streams; and where the at least one historical distribution is associated with the particular data processor for the lineage stream.

In some aspects, the techniques described herein relate to a system, where the at least one processor, upon execution of the software instructions, is further configured to: generate at least one change quantification for each initial change of the plurality of initial changes based at least in part on a numerical encoding of at least one character in the plurality of data items.

In some aspects, the techniques described herein relate to a system, where the plurality of initial lineage records is recorded in metadata of the plurality of data items.

In some aspects, the techniques described herein relate to a system, where the at least one processor, upon execution of the software instructions, is further configured to: generate the real-time dynamic distribution to represent the current data processor behavior for the particular data processor in the plurality of data processors based on the plurality of subsequent lineage records associated with a current period of time; where the current period of time includes a most recent day.

In some aspects, the techniques described herein relate to a system, where the at least one historical distribution includes at least one Gaussian distribution.

In some aspects, the techniques described herein relate to a system, where the at least one Gaussian distribution includes a compound Gaussian distribution.

In some aspects, the techniques described herein relate to a method including: receiving, by at least one processor, in real time, a plurality of initial lineage records that records a plurality of initial changes in a plurality of data items at each data processor of a plurality of data processors of a lineage stream over an initial time period; where the plurality of data processors relate to a plurality of processes performed on the plurality of data items during the initial time period; training, by the at least one processor, at least one baseline machine learning model for a particular data processor in the plurality of data processors based on a magnitude of each change associated with the particular data processor in each historical data item of a plurality of historical lineage records and an annotation associated with each historical data item indicative of whether each historical data item is anomalous; receiving, by at least one processor, in real time, a plurality of lineage records that records a plurality of subsequent changes in the plurality of data items at each data processor of the plurality of data processors of the lineage stream over a subsequent time period; inputting, by the at least one processor, the plurality of subsequent changes associated with the particular data into the at least one baseline machine learning model to cause a plurality of parameters of the at least one baseline machine learning model to output a probability of anomalous behavior of the particular data processor; determining, by the at least one processor, at least one data processor anomaly associated with the particular data processor based at least in part on the probability and a predetermined probability threshold; and generating, by the at least one processor, a user interface (UI) depicting a map of the lineage stream, where the UI is configured to label at least one data processor as the at least one data processor anomaly in the map so as to allow at least one action to affect the at least one data processor anomaly.

In some aspects, the techniques described herein relate to a method, where the plurality of data processors is specific to the lineage stream.

In some aspects, the techniques described herein relate to a method, where the plurality of data processors is shared across a plurality of lineage streams; and where the at least one baseline machine learning model is associated with the particular data processor for the lineage stream.

In some aspects, the techniques described herein relate to a method, further including: generating, by the at least one processor, at least one change quantification for each initial change of the plurality of initial changes based at least in part on a numerical encoding of at least one character in the plurality of data items.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
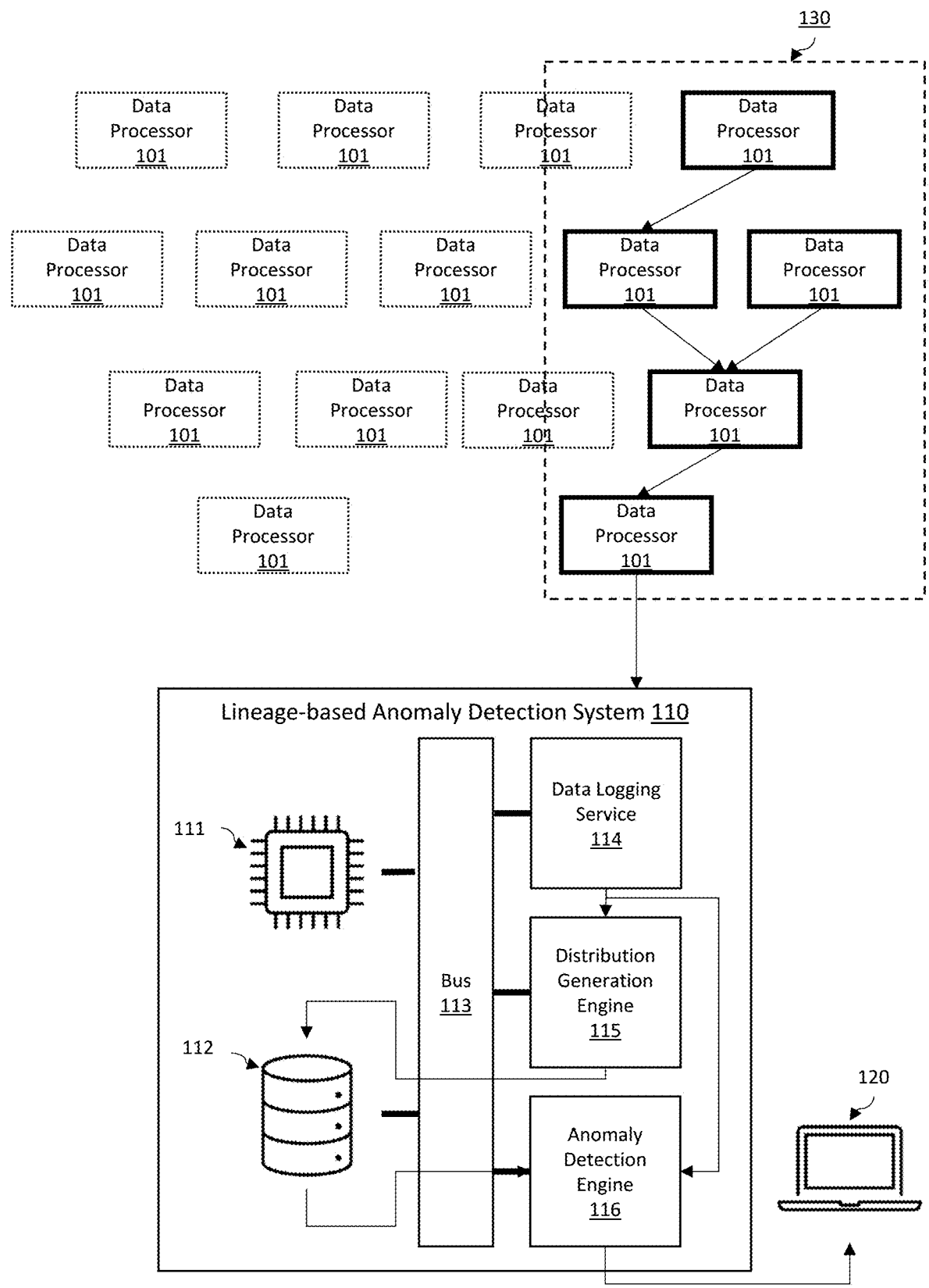
FIG. 1 depicts a lineage-based anomaly detection system for detection of anomalous data processors in a lineage stream in accordance with one or more embodiments of the present disclosure.

Various detailed embodiments of the present disclosure, taken in conjunction with the accompanying FIGS., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of anomaly detection using data lineage records for real-time trace analysis of the lineage stream. The following embodiments provide technical solutions and technical improvements that overcome technical problems, drawbacks and/or deficiencies in the technical fields involving detection of upstream faults and errors in processed data. As explained in more detail, below, technical solutions and technical improvements herein include aspects of improved anomaly detection by analyzing each individual data processor in a lineage stream based on historical lineage records to detect faulty or error-prone data processors before the errors and/or faults propagate to downstream systems. Thus, using identification of lineage streams and established baselines of the lineage stream, (or previously captured/recorded lineage hops), a deviation or anomaly in a change may be recognized through real-time log reporting, enabling faster alerting to downstream users or the upstream producers of data. As a result, anomalous data processors can be identified before data anomalies can be detected in the data itself. Based on such technical features, further technical benefits become available to users and operators of these systems and methods. Moreover, various practical applications of the disclosed technology are also described, which provide further practical benefits to users and operators that are also new and useful improvements in the art.

Referring to FIG. 1, a lineage-based anomaly detection system is depicted for detection of anomalous data processors in a lineage stream in accordance with one or more embodiments of the present disclosure.

In some embodiments, a lineage-based anomaly detection system 110 may interface with a system/network of data processors 101. In some embodiments, the data processors 101 may include sources and/or targets for data. Input data may be provided to a first data processor 101, which may serve as a source for a next data processor 101, which serves as the target. In providing the data to the target, the source may apply one or more transformations, analyses, changes, additions, removals, etc. of data items and/or values of the data. Thus, the source may process the data and provide the data to the target. In some embodiments, data may move through a series of data processors 101 such that a target may receive data, process the data and serve as a source to a next target, which in turn may receive the data, process the data and serve as source to another next target. In some embodiments, the processing and provision of data by a source may be referred to as a "hop", and a series of data processors may be referred to as a "lineage stream".

In some embodiments, the processing of the data at each data processor may be recorded, including tracking one or more changes to one or more values of the data. The changes may be a magnitude change, a vector change, a string change, a volume of changes, or other type of change or any combination thereof. The change(s) applied at each data processor by each data processor 101 in a given lineage stream 130 may be tracked and communicated along the lineage stream 130 alongside the data. In some embodiments, the change(s) may be tracked in, e.g., metadata associated with the data, or in an additional file that is linked to, referenced, or otherwise associated with the data.

In some embodiments, the lineage-based anomaly detection system 110 receives the data with the change(s) applied at each data processor in the lineage stream 130. Based on the change(s), the lineage-based anomaly detection system 110 may employ a data logging service 114, a distribution generation engine 115 and an anomaly detection engine 116 to detect any data processors in the lineage stream 130 exhibiting anomalous behavior based on historical behavior.

In some embodiments, the lineage-based anomaly detection system 110 may include hardware components such as a processor 111, which may include local or remote processing components. In some embodiments, the processor 111 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 111 may include data-processing capacity provided by the microprocessor. In some embodiments, the microprocessor may include memory, processing, interface resources, controllers, and counters. In some embodiments, the microprocessor may also include one or more programs stored in memory.

Similarly, the lineage-based anomaly detection system 110 may include storage 112, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage 112 may include, e.g., a suitable non-transient computer readable medium such as, e.g., random access memory (RAM), read only memory (ROM), one or more buffers and/or caches, among other memory devices or any combination thereof.

In some embodiments, the lineage-based anomaly detection system 110 may implement computer engines for logging data and changes to data from lineage streams 130, baseline generation to characterize expected operation of each data processor 101 according to historical behaviors, and anomaly detection leveraging the baseline of each data processor 101. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to log data and the changes thereof as a result of data processor 101 operation in a lineage stream 130, the lineage-based anomaly detection system 110 may include computer engines including, e.g., a data logging service 114. In some embodiments, the data logging service 114 may include dedicated and/or shared software components, hardware components, or a combination thereof. For example, the data logging service 114 may include a dedicated processor and storage. However, in some embodiments, the data logging service 114 may share hardware resources, including the processor 111 and storage 112 of the lineage-based anomaly detection system 110 via, e.g., a bus 113.

In some embodiments, a particular lineage stream 130 may output one or more data items. In some embodiments, the data item(s) may include, e.g., a value, a string, a file, an object, an array, a vector, a folder, or other data structure or combination of data structures. In some embodiments, each data processor along the lineage stream 130 (depicted in an illustrative form in FIG. 1), may apply a change to the data item(s) to transform the data item(s) as input into the data item(s) as output from the lineage stream 130. The change applied by each data processor along the lineage stream 130 may be appended to a lineage record associated with the data item(s). In some embodiments, the lineage record may log a data processor identifier that identifies the data processor 101 associated with a particular hop, the change applied by the particular hop, an indicator representative of the data item(s) before the change, an indicator representative of the data item(s) after the change, a time the change was applied, a number of changes applied, among other change-related metrics or any combination thereof.

In some embodiments, the data lineage-based anomaly detection system 110 may receive the data item(s) from the lineage stream 130 and call the data logging service 114 to log the data item(s) and/or lineage record, e.g., in the storage 112 or in another data storage solution. In some embodiments, the data logging service 114 may maintain a profile for each data processor 101 and/or each lineage stream 130. Thus, upon receiving the data item(s), the data logging service 114 may access the lineage record and catalog the change(s) applied by each data processor 101 in the lineage stream 130 in a respective data processor profile and/or data lineage profile.

In some embodiments, herein the term "profile" refers to a collection of data associated with a particular hardware and/or software entity, including, e.g., the data processors 101. In some embodiments, the particular hardware and/or software entity may include a composite entity formed from multiple individual or composite entities. For example, the data lineage 130 may be a composite entity include each individual data processor 101 entity. Each hardware and/or software entity may have a profile in the data storage solution to aggregate the history of data item(s) and/or changes made by the entity. In some embodiments, composite entities may be a logical entity with a logically defined profile encompassing all associated individual profiles of all associated individual entities. Alternatively, or in addition, composite entities may have distinct profiles from each individual entity.

In some embodiments, the profiles may include any suitable data structure, such as, e.g., a table, array, list, file, database object, document, etc. to store the history of data item(s) and/or changes made by the entity associated with each profile. Thus, in some embodiments, the data logging service 114 may query the profile associated with each particular data processor 101 in the lineage stream 130, and append the data item(s) and/or change(s) associated each particular data processor 101, e.g., based on the data processor identifier. Accordingly, the data logging service 114 may construct a history of data item(s) and/or changes made by or otherwise associated with each data processor 101 and/or each lineage stream 130.

In some embodiments, the history of data item(s) and/or change(s) associated with each data processor 101 may be employed to construct a baseline of expected behavior by each data processor. Thus, the lineage-based anomaly detection system 110 may include computer engines including, e.g., a distribution generation engine 115. In some embodiments, the distribution generation engine 115 may include dedicated and/or shared software components, hardware components, or a combination thereof. For example, the distribution generation engine 115 may include a dedicated processor and storage. However, in some embodiments, the distribution generation engine 115 may share hardware resources, including the processor 111 and storage 112 of the lineage-based anomaly detection system 110 via, e.g., a bus 113.

In some embodiments, the distribution generation engine 115 may access the profile associated with each data processor 101 and/or lineage stream 130 to analyze the data item(s) and/or change(s) represented therein. In some embodiments, the distribution generation engine 115 may quantify an activity performed by each data processor 101 for each data item. For example, for a particular data processor 101, the distribution generation engine 115 may access, e.g., based on the data processor identifier, the profile associated with the particular data processor 101 and extract the history of data item(s) and/or change(s). In some embodiments, each data item and/or change associated with the data processor may be quantified. For example, each data item may include a value, set of values, vector, array, or other numerical data item for which each change may be directly represented as the magnitude of the change to one or more values of the data item. Alternatively, or in addition, each data item may include a string, e.g., alone, in a list, in an array, in a vector, or in another data structure or combination thereof, for which a quantification may be derived, e.g., as a volume of changes (e.g., number of characters changed), a magnitude of a change from a numerically encoded form of the data item, or by another quantification technique or any combination thereof.

In some embodiments, the distribution generation engine 115 may use the quantified change(s) made by each data processor 101 to establish a statistically generated baseline for each data processor 101. In some embodiments, to generate the baseline, the distribution generation engine 115 may use the historical data item(s) and/or change(s) to fit a probability density function and/or probability distribution to the values associated therewith. In some embodiments, the probability density function may be in the form of a continuous/cumulative probability distribution.

In some embodiments, the probability distribution may include, e.g., a normal distribution, a Gaussian distribution, a log-normal distribution, a Pareto distribution, a Poisson distribution, a continuous uniform distribution, a Bernoulli distribution, a binomial distribution, a negative binomial distribution, a geometric distribution, a Chi-squared distribution, a t-distribution, an F-distribution, a beta distribution, a Gamma distribution, a Dirichlet distribution, a Wishart distribution, or other distribution or any combination thereof. In some embodiments, the probability distribution may include, e.g., a mixture distribution, a compound probability distribution, a parametric distribution, or other mixed distribution or any combination thereof.

In some embodiments, the distribution generation engine 115 may train parameters of a probability distribution to create a probability density function from the parameters that represents a baseline distribution for historical (e.g., "expected") behavior of each data processor 101. In some embodiments, a baseline distribution may be modelled for each data processor 101 individually to represent the expected behavior of each individual data processor 101. The baseline distribution approximates a true distribution of the data item(s) and/or change(s).

In some embodiments, an approximation technique may be employed to iteratively converge on probability density function parameters that is a most likely approximate of a true distribution of data item(s) and/or change(s). In some embodiments, the parameters may be updated according to, e.g., a variational inference technique, such as, e.g., a mean field algorithm, or an expectation-maximization technique, such as, e.g., maximum a posteriori estimation, or any other suitable approximation algorithm. In some embodiments, to facilitate the efficient training of the baseline distribution, the distribution generation engine 115 may utilize a variational inferencing mean field to determine the probability density function of the baseline distribution based on the historical log of data item(s) and/or change(s) for a particular data processor 101. In some embodiments, the variational inferencing mean fields can reduce runtime in formulating the approximation of the baseline distribution from weeks to hours.

In some embodiments, the baseline distribution created for each data processor 101 may be stored in and/or referenced by the respective profile of each data processor 101. In some embodiments, the baseline distribution may be for a particular data processor 101 regardless of the lineage stream in which the data processor 101 operates (e.g., where the data processor 101 may be a part of multiple lineage streams 130). Therefore, the baseline distribution for the particular data processor 101 may be linked to, referenced in and/or stored in the profile associated with the data processor 101 for access regardless of the lineage stream 130. In some embodiments, the baseline distribution may be for the particular data processor 101 in the context of a particular lineage stream 130. As a result, the baseline distribution may be linked to, referenced in and/or stored in a profile associated with the particular data processor 101 and a profile associated with the particular lineage stream 130. In some embodiments, where the baseline distribution is for the particular data processor 101 in the context of the particular lineage stream 130, the particular data processor 101 may have a profile specific to the particular lineage stream 130. Thus, the particular data processor 101 may have separate profiles for each lineage stream 130 in which the particular data processor 101 operates.

Thus, for subsequent data items, the lineage-based anomaly detection system 110 may access the baseline distribution for the particular data processor 101 to assess a current behavior of the particular data processor 101.

In some embodiments, assessing the current behavior of the particular data processor 101 may be performed by an anomaly detection engine 116 of the lineage-based anomaly detection system 110. In some embodiments, the anomaly detection engine 116 may include dedicated and/or shared software components, hardware components, or a combination thereof. For example, the anomaly detection engine 116 may include a dedicated processor and storage. However, in some embodiments, the anomaly detection engine 116 may share hardware resources, including the processor 111 and storage 112 of the lineage-based anomaly detection system 110 via, e.g., a bus 113.

In some embodiments, the lineage-based anomaly detection system 110 may receive a subsequent data item from the lineage stream 130 that results from changes applied to an input data item by the data processors 101 of the lineage stream 130. In some embodiments, anomaly detection engine 116 may access the profile associated with each data processor 101 of the lineage stream 130 associated with the subsequent data item. In some embodiments, the anomaly detection engine 116 may access the profile of each particular data processor 101 and/or the profile of each particular data processor 101 of the particular lineage stream 130. In doing so, the anomaly detection engine 116 may access the baseline distribution of the particular data processor 101 and/or lineage stream-specific baseline distribution of the particular data processor 101.

In some embodiments, the anomaly detection engine 116 may use the baseline distribution to determine whether the subsequent data item is within the expected behavior of the particular data processor 101. To do so, the anomaly detection engine 116 may quantify the subsequent data item and/or change(s) associated therewith based on the change(s) made by the particular data processor 101. For example, as detailed above, each data item may include a value, set of values, vector, array, or other numerical data item for which each change may be directly represented as the magnitude of the change to one or more values of the data item. Alternatively, or in addition, each data item may include a string, e.g., alone, in a list, in an array, in a vector, or in another data structure or combination thereof, for which a quantification may be derived, e.g., as a volume of changes (e.g., number of characters changed), a magnitude of a change from a numerically encoded form of the data item, or by another quantification technique or any combination thereof.

In some embodiments, the anomaly detection engine 116 may compare the quantification of the subsequent data item to the baseline distribution to determine whether the change(s) made by the particular data processor 101 represents an anomaly to the expected behavior of the particular data processor 101. For example, in some embodiments, the anomaly detection engine 116 may apply one or more predetermined probability thresholds that establish one or more threshold magnitudes of probability of values associated with changes made by the particular data processor 101. In some embodiments, a minimum probability threshold may be employed to identify the subsequent data item as an anomaly whereby a probability of the quantification associated with the change to the subsequent data item made by the particular data processor 101 may be determined based on the baseline distribution. Where the probability is below the minimum probability threshold, the anomaly detection engine 116 may identify the subsequent data item as an anomaly to the expected operation of the particular data processor 101.

In some embodiments, to limit the risk of false positives and accommodate the possibility for outlier changes, the minimum probability threshold may be used to identify the subsequent data item as a potential anomaly to the expected operation of the particular data processor 101. In some embodiments, where change(s) by the particular data processor 101 for one or more subsequent data items are identified as potential anomalies, the anomaly detection engine 116 may further analyze the current behavior of the particular data processor 101 by instructing the distribution generation engine 115 to construct a real-time dynamic distribution to represent the current behavior of the particular data processor 101. In some embodiments, the real-time dynamic distribution may be constructed in a similar way to the baseline distribution, as detailed above, except that the real-time dynamic distribution may be for a set of data items having changes by the particular data processor 101 within a current period of time. In some embodiments, the current period of time may be a most recent, e.g., five minutes, ten minutes, fifteen minutes, twenty minutes, thirty minutes, forty five minutes, hour, two hours, three hours, four hours, five hours, six hours, seven hours, eight hours, nine hours, ten hours, eleven hours, twelve hours, twenty-four hours, two days, three days, four days, five days, six days, seven days, or other period of time in a range of between one minutes and four weeks.

In some embodiments, rather than generating the real-time dynamic distribution based on a detection of a potential anomaly, the distribution generation engine 115 may periodically and/or continually update the real-time dynamic distribution as subsequent data items are received. In some embodiments, the set of data items used as historical data items for the establishment of the baseline distribution may be distinct from the set of current data items used for the establishment of the real-time dynamic distribution. For example, the data items having changes by the particular data processor 101 that precede the current period of time may be used as the historical data items. In some embodiments, the set of data items used as historical data items for the establishment of the baseline distribution may intersect, e.g., by any amount of time less than the current period of time.

In some embodiments, the real-time dynamic distribution may be compared to the baseline distribution to determine a deviation between the real-time dynamic distribution may be compared to the baseline distribution. In some embodiments, the deviation may be formulated based on, e.g., a magnitude of change of the expected value of each of the baseline distribution and the real-time dynamic distribution, a magnitude of change of the standard deviation of each of the baseline distribution and the real-time dynamic distribution, or a magnitude of change of any other parameter of each of the baseline distribution and the real-time dynamic distribution, or any combination and/or weight combination of a change of a parameter between each of the baseline distribution and the real-time dynamic distribution.

In some embodiments, where the deviation exceeds a predetermined deviation threshold, the anomaly detection engine 116 may identify the particular data processor 101 as having anomalous behavior that may be indicative of an error, fault, corruption, malware attack, or other irregular behavior. As a result, the anomaly detection engine 116 may notify an administrator of the detected anomalous behavior. To do so, in some embodiments, the anomaly detection engine 116 may generate a notification to a computing device 120 associated with the administrator. In some embodiments, In particular, in embodiments, the computing device 120 may interface with the lineage-based anomaly detection system 110 and/or the anomaly detection engine 116 using an application programming interface (API) and/or via the bus 113. In some embodiments, "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, using a graphical user interface (GUI), the administrator may select aspects of the data to organize and filter detected anomalies. Such a selection may be sent to the lineage-based anomaly detection system 110 for a process to be instantiated within the lineage-based anomaly detection system 110, such as, e.g., a request for anomalies matching particular descriptions selected in the GUI. For example, in some embodiments, the administrator may select a "heat map" of anomaly counts based on date and severity (e.g., magnitude and/or frequency of deviation from expected behavior, based on the real-time dynamic deviation and/or individual data items). In an embodiment, a heat map is a two-dimensional grid having an x-axis and a y-axis, where grid spaces depict a quantity of anomalies at the intersection of a value on the x-axis and a value on the y-axis. Thus, in embodiments, the lineage-based anomaly detection system 110 may communicate with the anomaly detection engine 116 and the storage 112 to retrieve, extract, and operate on the data associated with the administrator request. For example, the API request may include anomaly detection and recommendation tasks to recognize anomalies. Thus, the API request may call the anomaly detection engine 116 for instantiation to generate the appropriate detected anomalies in real-time. Alternatively, the anomaly detection engine 116 may be independently instantiated to produce detected anomalies for new data when triggered, such as, e.g., when the lineage stream 130 provides the subsequent data item(s). Alternatively, the anomaly detection engine 116 may be independently instantiated to produce detected anomalies for new data on a periodic basis, such as, e.g., every minute, hourly, daily, weekly, biweekly, monthly, or according to any other suitable period. The detected anomalies may then be returned to one or more databases for recording detected anomalies of the storage 112. In embodiments, where the detected anomalies are maintained in the storage 112, the API request may call the detected anomalies from the storage 112 upon, e.g., administrator request for sets of the detected anomalies. Accordingly, administrators may interact with the data in the storage 112 via the API. Such interactions may include, e.g., overriding automatic designations of an anomaly or change point, override the severity or classification by the anomaly detection engine 116, annotate anomalies with metadata, include root cause analysis, task management tickets such as, e.g., JIRA™ tickets, links to documentation, among other modifications to the detected anomalies. Such interactions may be performed by multiple administrators at multiple computing device 120 in a collaborative fashion.

In an embodiment, such an administrator request, as well as other possible administrator requests via the GUI may have associated administrator interface (UI) requests to display the data in the selected format. Thus, the lineage-based anomaly detection system 110 may also generate a UI target group for orchestrating the lineage-based anomaly detection system 110 to produce the UI features to be returned to the computing device 120. In some embodiments, the UI features may be selected and/or customized at the computing device 120, and generated by the lineage-based anomaly detection system 110 upon the UI target group instantiation. Thus, administrators may visually explore events and anomalies in customizable views, e.g., charts and tables in the context of surrounding data items. Administrators may analyze anomalies in one variable and a set of dimensions in the context of related variables and dimensions, as well as associate events with each other. The GUI provides tools for visualizations that may be formed and returned by the lineage-based anomaly detection system 110 is organized in an administrator friendly and interpretable manner.

Figure 2:
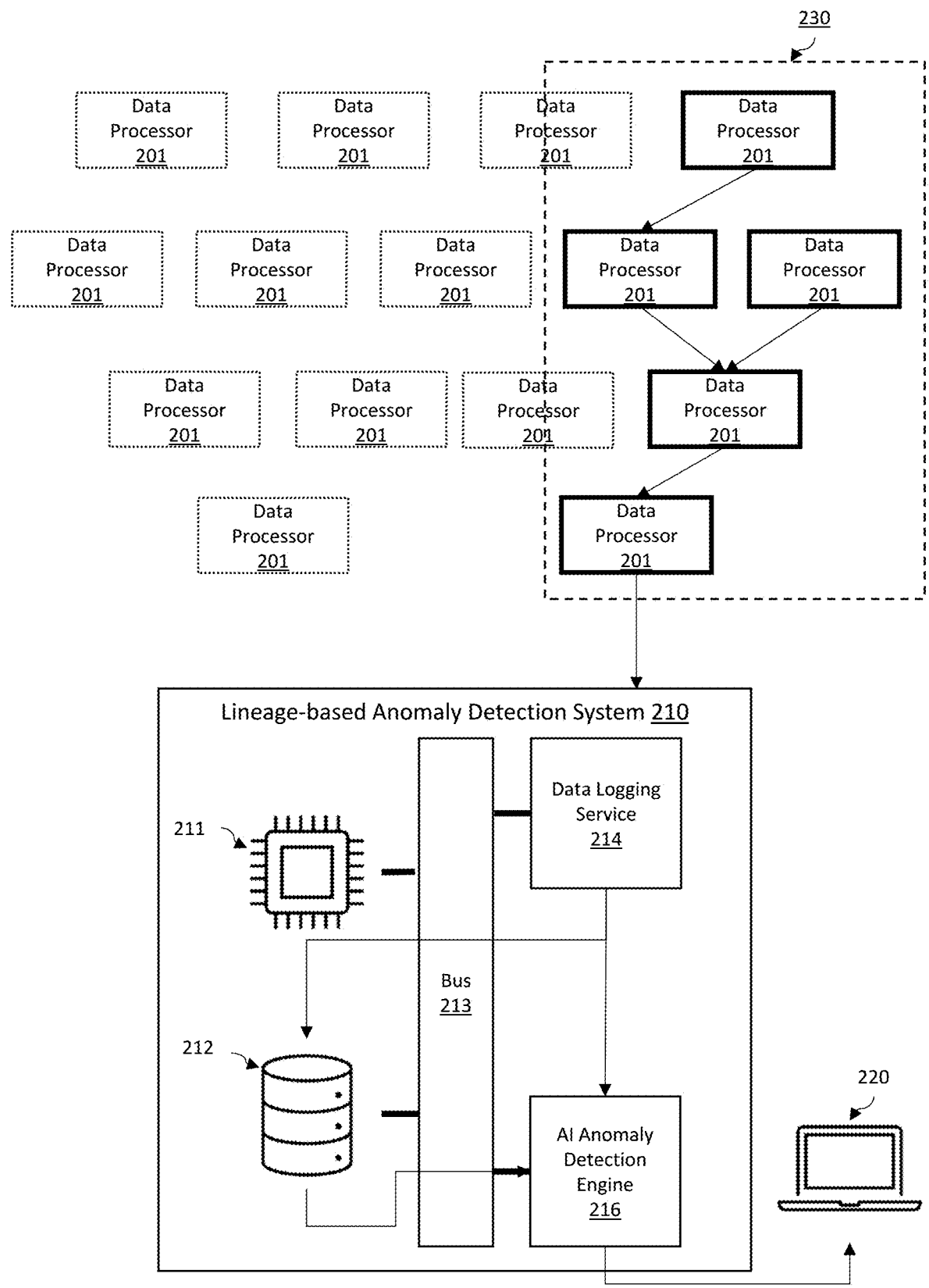
FIG. 2 depicts another lineage-based anomaly detection system for detection of anomalous data processors in a lineage stream in accordance with one or more embodiments of the present disclosure.

Referring to FIG. 2, another lineage-based anomaly detection system is depicted for detection of anomalous data processors in a lineage stream in accordance with one or more embodiments of the present disclosure.

In some embodiments, a lineage-based anomaly detection system 210 may interface with a system/network of data processors 201. In some embodiments, the data processors 201 may include sources and/or targets for data. Input data may be provided to a first data processor 201, which may serve as a source for a next data processor 201, which serves as the target. In providing the data to the target, the source may apply one or more transformations, analyses, changes, additions, removals, etc. of data items and/or values of the data. Thus, the source may process the data and provide the data to the target. In some embodiments, data may move through a series of data processors 201 such that a target may receive data, process the data and serve as a source to a next target, which in turn may receive the data, process the data and serve as source to another next target. In some embodiments, the processing and provision of data by a source may be referred to as a "hop", and a series of data processors may be referred to as a "lineage stream".

In some embodiments, the processing of the data at each data processor may be recorded, including tracking one or more changes to one or more values of the data. The changes may be a magnitude change, a vector change, a string change, a volume of changes, or other type of change or any combination thereof. The change(s) applied at each data processor by each data processor 201 in a given lineage stream 230 may be tracked and communicated along the lineage stream 230 alongside the data. In some embodiments, the change(s) may be tracked in, e.g., metadata associated with the data, or in an additional file that is linked to, referenced, or otherwise associated with the data.

In some embodiments, the lineage-based anomaly detection system 210 receives the data with the change(s) applied at each data processor in the lineage stream 230. Based on the change(s), the lineage-based anomaly detection system 210 may employ a data logging service 214 and an anomaly detection engine 216 to detect any data processors in the lineage stream 230 exhibiting anomalous behavior based on historical behavior.

In some embodiments, the lineage-based anomaly detection system 210 may include hardware components such as a processor 211, which may include local or remote processing components. In some embodiments, the processor 211 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 211 may include data-processing capacity provided by the microprocessor. In some embodiments, the microprocessor may include memory, processing, interface resources, controllers, and counters. In some embodiments, the microprocessor may also include one or more programs stored in memory.

Similarly, the lineage-based anomaly detection system 210 may include storage 212, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage 212 may include, e.g., a suitable non-transient computer readable medium such as, e.g., random access memory (RAM), read only memory (ROM), one or more buffers and/or caches, among other memory devices or any combination thereof.

In some embodiments, the lineage-based anomaly detection system 210 may implement computer engines for logging data and changes to data from lineage streams 230, and training and utilizing one or more machine learning models to model expected operation of each data processor 201 according to historical behaviors. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to log data and the changes thereof as a result of data processor 201 operation in a lineage stream 230, the lineage-based anomaly detection system 210 may include computer engines including, e.g., a data logging service 214. In some embodiments, the data logging service 214 may include dedicated and/or shared software components, hardware components, or a combination thereof. For example, the data logging service 214 may include a dedicated processor and storage. However, in some embodiments, the data logging service 214 may share hardware resources, including the processor 211 and storage 212 of the lineage-based anomaly detection system 210 via, e.g., a bus 213.

In some embodiments, a particular lineage stream 230 may output one or more data items. In some embodiments, the data item(s) may include, e.g., a value, a string, a file, an object, an array, a vector, a folder, or other data structure or combination of data structures. In some embodiments, each data processor along the lineage stream 230 (depicted in an illustrative form in FIG. 2), may apply a change to the data item(s) to transform the data item(s) as input into the data item(s) as output from the lineage stream 230. The change applied by each data processor along the lineage stream 230 may be appended to a lineage record associated with the data item(s). In some embodiments, the lineage record may log a data processor identifier that identifies the data processor 201 associated with a particular hop, the change applied by the particular hop, an indicator representative of the data item(s) before the change, an indicator representative of the data item(s) after the change, a time the change was applied, a number of changes applied, among other change-related metrics or any combination thereof.

In some embodiments, the data lineage-based anomaly detection system 210 may receive the data item(s) from the lineage stream 230 and call the data logging service 214 to log the data item(s) and/or lineage record, e.g., in the storage 212 or in another data storage solution. In some embodiments, the data logging service 214 may maintain a profile for each data processor 201 and/or each lineage stream 230. Thus, upon receiving the data item(s), the data logging service 214 may access the lineage record and catalog the change(s) applied by each data processor 201 in the lineage stream 230 in a respective data processor profile and/or data lineage profile.

In some embodiments, herein the term "profile" refers to a collection of data associated with a particular hardware and/or software entity, including, e.g., the data processors 201. In some embodiments, the particular hardware and/or software entity may include a composite entity formed from multiple individual or composite entities. For example, the data lineage 230 may be a composite entity include each individual data processor 201 entity. Each hardware and/or software entity may have a profile in the data storage solution to aggregate the history of data item(s) and/or changes made by the entity. In some embodiments, composite entities may be a logical entity with a logically defined profile encompassing all associated individual profiles of all associated individual entities. Alternatively, or in addition, composite entities may have distinct profiles from each individual entity.

In some embodiments, the profiles may include any suitable data structure, such as, e.g., a table, array, list, file, database object, document, etc. to stored the history of data item(s) and/or changes made by the entity associated with each profile. Thus, in some embodiments, the data logging service 214 may query the profile associated with each particular data processor 201 in the lineage stream 230, and append the data item(s) and/or change(s) associated each particular data processor 201, e.g., based on the data processor identifier. Accordingly, the data logging service 214 may construct a history of data item(s) and/or changes made by or otherwise associated with each data processor 201 and/or each lineage stream 230.

In some embodiments, the history of data item(s) and/or change(s) associated with each data processor 201 may be employed to construct and implement a machine learning model based on expected behavior by each data processor. Thus, the lineage-based anomaly detection system 210 may include computer engines including, e.g., an AI anomaly detection engine 216. In some embodiments, the AI anomaly detection engine 216 may include dedicated and/or shared software components, hardware components, or a combination thereof. For example, the AI anomaly detection engine 216 may include a dedicated processor and storage. However, in some embodiments, the AI anomaly detection engine 216 may share hardware resources, including the processor 211 and storage 212 of the lineage-based anomaly detection system 210 via, e.g., a bus 213.

In some embodiments, the AI anomaly detection engine 216 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  a. define Neural Network architecture/model,
  b. transfer the input data to the exemplary neural network model,
  c. train the exemplary model incrementally,
  d. determine the accuracy for a specific number of timesteps,
  e. apply the exemplary trained model to process the newly-received input data,
  f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the AI anomaly detection engine 216 may access the profile associated with each data processor 201 and/or lineage stream 230 to analyze the data item(s) and/or change(s) represented therein. In some embodiments, the AI anomaly detection engine 216 may quantify an activity performed by each data processor 201 for each data item. For example, for a particular data processor 201, the AI anomaly detection engine 216 may access, e.g., based on the data processor identifier, the profile associated with the particular data processor 201 and extract the history of data item(s) and/or change(s). In some embodiments, each data item and/or change associated with the data processor may be quantified. For example, each data item may include a value, set of values, vector, array, or other numerical data item for which each change may be directly represented as the magnitude of the change to one or more values of the data item. Alternatively, or in addition, each data item may include a string, e.g., alone, in a list, in an array, in a vector, or in another data structure or combination thereof, for which a quantification may be derived, e.g., as a volume of changes (e.g., number of characters changed), a magnitude of a change from a numerically encoded form of the data item, or by another quantification technique or any combination thereof.

In some embodiments, the AI anomaly detection engine 216 may use the quantified change(s) made by each data processor 201 to train a respective baseline machine learning model that models the expected behavior of each data processor 201. In some embodiments, the baseline machine learning model 216 ingests a feature vector that encodes features representative of the quantification of the data item(s) and/or change(s) made by a particular data processor 201. In some embodiments, the baseline machine learning model 216 processes the feature vector with parameters to produces a prediction of whether the data item(s) and/or change(s) made by the particular data processor 201 is anomalous to the expected behavior of the particular data processor 201. In some embodiments, the parameters of the baseline machine learning model 216 may be implemented in a suitable machine learning model including a classifier machine learning model, such as, e.g., a convolutional neural network (CNN), a Naive Bayes classifier, decision trees, random forest, support vector machine (SVM), K-Nearest Neighbors, or any other suitable algorithm for a classification model. In some embodiments, for computational efficiency while preserving accuracy of predictions, the baseline machine learning model 216 may advantageously include a random forest classification model.

In some embodiments, the baseline machine learning model 216 processes the features encoded in the feature vector by applying the parameters of the classifier machine learning model to produce a model output vector. In some embodiments, the model output vector may be decoded to generate one or more labels indicative of whether the data item(s) and/or change(s) made by the particular data processor 201 is anomalous to the expected behavior of the particular data processor 201. In some embodiments, the model output vector may include or may be decoded to reveal a numerical output, e.g., one or more probability values between 0 and 1 where each probability value indicates a degree of probability that a particular label correctly classifies the quantification of the data item(s) and/or change(s) made by a particular data processor 201. In some embodiments, the baseline machine learning model 216 may test each probability value against a respective probability threshold. In some embodiments, each probability value has an independently learned and/or configured probability threshold. Alternatively or additionally, in some embodiments, one or more of the probability values of the model output vector may share a common probability threshold. In some embodiments, where a probability value is greater than the corresponding probability threshold, the quantification of the data item(s) and/or change(s) made by a particular data processor 201 is labeled according to the corresponding label. For example, the probability threshold can be, e.g., greater than 0.5, greater than 0.6, greater than 0.7, greater than 0.8, greater than 0.9, or other suitable threshold value. Therefore, in some embodiments, the baseline machine learning model 216 may produce the whether the data item(s) and/or change(s) made by the particular data processor 201 is anomalous to the expected behavior of the particular data processor 201 for a particular the quantification of the data item(s) and/or change(s) made by a particular data processor 201 based on the probability value(s) of the model output vector and the probability threshold(s).

In some embodiments, the parameters of the baseline machine learning model 216 may be trained based on known outputs. For example, the quantification of the data item(s) and/or change(s) made by a particular data processor 201 may be paired with a target classification or known classification to form a training pair, such as a historical the quantification of the data item(s) and/or change(s) made by a particular data processor 201 and an observed result and/or human annotated classification denoting whether the historical the quantification of the data item(s) and/or change(s) made by a particular data processor 201 is anomalous. In some embodiments, the quantification of the data item(s) and/or change(s) made by a particular data processor 201 may be provided to the baseline machine learning model 216, e.g., encoded in a feature vector, to produce a predicted label. In some embodiments, an optimizer associated with the baseline machine learning model 216 may then compare the predicted label with the known output of a training pair including the historical the quantification of the data item(s) and/or change(s) made by a particular data processor 201 to determine an error of the predicted label. In some embodiments, the optimizer may employ a loss function, such as, e.g., Hinge Loss, Multi-class SVM Loss, Cross Entropy Loss, Negative Log Likelihood, or other suitable classification loss function to determine the error of the predicted label based on the known output.

In some embodiments, the known output may be obtained after the baseline machine learning model 216 produces the prediction, such as in online learning scenarios. In such a scenario, the baseline machine learning model 216 may receive the quantification of the data item(s) and/or change(s) made by a particular data processor 201 and generate the model output vector to produce a label classifying the quantification of the data item(s) and/or change(s) made by a particular data processor 201. Subsequently, a user may provide feedback by, e.g., modifying, adjusting, removing, and/or verifying the label via a suitable feedback mechanism, such as a user interface device (e.g., keyboard, mouse, touch screen, user interface, or other interface mechanism of a user device or any suitable combination thereof). The feedback may be paired with the quantification of the data item(s) and/or change(s) made by a particular data processor 201 to form the training pair and the optimizer may determine an error of the predicted label using the feedback.

In some embodiments, based on the error, the optimizer may update the parameters of the baseline machine learning model 216 using a suitable training algorithm such as, e.g., backpropagation for a classifier machine learning model. In some embodiments, backpropagation may include any suitable minimization algorithm such as a gradient method of the loss function with respect to the weights of the classifier machine learning model. Examples of suitable gradient methods include, e.g., stochastic gradient descent, batch gradient descent, mini-batch gradient descent, or other suitable gradient descent technique. As a result, the optimizer may update the parameters of the baseline machine learning model 216 based on the error of predicted labels in order to train the baseline machine learning model 216 to model the correlation between the quantification of the data item(s) and/or change(s) made by a particular data processor 201 and whether the data item(s) and/or change(s) made by the particular data processor 201 is anomalous to the expected behavior of the particular data processor 201 in order to produce more accurate labels of the quantification of the data item(s) and/or change(s) made by a particular data processor 201.

In some embodiments, the baseline machine learning model created for each data processor 201 may be stored in and/or referenced by the respective profile of each data processor 201. In some embodiments, the baseline machine learning model may be for a particular data processor 201 regardless of the lineage stream in which the data processor 201 operates (e.g., where the data processor 201 may be a part of multiple lineage streams 230). Therefore, the baseline machine learning model for the particular data processor 201 may be linked to, referenced in and/or stored in the profile associated with the data processor 201 for access regardless of the lineage stream 230. In some embodiments, the baseline machine learning model may be for the particular data processor 201 in the context of a particular lineage stream 230. As a result, the baseline machine learning model may be linked to, referenced in and/or stored in a profile associated with the particular data processor 201 and a profile associated with the particular lineage stream 230. In some embodiments, where the baseline machine learning model is for the particular data processor 201 in the context of the particular lineage stream 230, the particular data processor 201 may have a profile specific to the particular lineage stream 230. Thus, the particular data processor 201 may have separate profiles for each lineage stream 230 in which the particular data processor 201 operates.

Thus, for subsequent data items, the lineage-based anomaly detection system 210 may access the baseline machine learning model for the particular data processor 201 to assess a current behavior of the particular data processor 201.

In some embodiments, to assess the current behavior of the particular data processor 201, the lineage-based anomaly detection system 210 may receive a subsequent data item from the lineage stream 230 that results from changes applied to an input data item by the data processors 201 of the lineage stream 230. In some embodiments, AI anomaly detection engine 216 may access the profile associated with each data processor 201 of the lineage stream 230 associated with the subsequent data item. In some embodiments, the AI anomaly detection engine 216 may access the profile of each particular data processor 201 and/or the profile of each particular data processor 201 of the particular lineage stream 230. In doing so, the AI anomaly detection engine 216 may access the baseline machine learning model of the particular data processor 201 and/or lineage stream-specific baseline machine learning model of the particular data processor 201.

In some embodiments, the AI anomaly detection engine 216 may use the baseline machine learning model to determine whether the subsequent data item is within the expected behavior of the particular data processor 201. To do so, the AI anomaly detection engine 216 may quantify the subsequent data item and/or change(s) associated therewith based on the change(s) made by the particular data processor 201. For example, as detailed above, each data item may include a value, set of values, vector, array, or other numerical data item for which each change may be directly represented as the magnitude of the change to one or more values of the data item. Alternatively, or in addition, each data item may include a string, e.g., alone, in a list, in an array, in a vector, or in another data structure or combination thereof, for which a quantification may be derived, e.g., as a volume of changes (e.g., number of characters changed), a magnitude of a change from a numerically encoded form of the data item, or by another quantification technique or any combination thereof.

In some embodiments, the AI anomaly detection engine 216 may ingest the quantification of the subsequent data item(s) and/or change(s). Based on the training detailed above, the parameters of the baseline machine learning model may output a probability value and/or label indicative of whether the subsequent data item(s) and/or change(s) may be the particular data processor 201 is anomalous. In some embodiments, the probability value may be a probability that the quantification is anomalous, or a probability that the quantification is not anomalous, or two probability values indicative of each of a probability that the quantification is anomalous and a probability that the quantification is not anomalous. In some embodiments, based on the probability value(s), the AI anomaly detection engine 216 label the subsequent data item(s) as having a change made by the particular data processor 201 that is indicative of anomaly with the particular data processor 201.

In some embodiments, the AI anomaly detection engine 216 may periodically and/or continually update the training of the baseline machine learning model as subsequent data items are received. In some embodiments, the training may be updated, for example, once per minute, hour, day, week, month, year, quarter, etc. or by any other suitable period or any combination thereof. In some embodiments, the training may include a decay factor to weight more heavily more recent data item(s) and weight less highly older data item(s).

In some embodiments, where the particular data processor 201 has made a change that is classified as anomalous, the AI anomaly detection engine 216 may identify the particular data processor 201 as having anomalous behavior that may be indicative of an error, fault, corruption, malware attack, or other irregular behavior. As a result, the AI anomaly detection engine 216 may notify an administrator of the detected anomalous behavior. To do so, in some embodiments, the AI anomaly detection engine 216 may generate a notification to a computing device 220 associated with the administrator. In some embodiments, In particular, in embodiments, the computing device 220 may interface with the lineage-based anomaly detection system 210 and/or the AI anomaly detection engine 216 using an application programming interface (API) and/or via the bus 213. In some embodiments, "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, using a graphical user interface (GUI), the administrator may select aspects of the data to organize and filter detected anomalies. Such a selection may be sent to the lineage-based anomaly detection system 210 for a process to be instantiated within the lineage-based anomaly detection system 210, such as, e.g., a request for anomalies matching particular descriptions selected in the GUI. For example, in some embodiments, the administrator may select a "heat map" of anomaly counts based on date and severity (e.g., magnitude and/or frequency of deviation from expected behavior, based on the real-time dynamic deviation and/or individual data items). In an embodiment, a heat map is a two-dimensional grid having an x-axis and a y-axis, where grid spaces depict a quantity of anomalies at the intersection of a value on the x-axis and a value on the y-axis. Thus, in embodiments, the lineage-based anomaly detection 210 may communicate with the AI anomaly detection engine 216 and the storage 212 to retrieve, extract, and operate on the data associated with the administrator request. For example, the API request may include anomaly detection and recommendation tasks to recognize anomalies. Thus, the API request may call the AI anomaly detection engine 216 for instantiation to generate the appropriate detected anomalies in real-time. Alternatively, the AI anomaly detection engine 216 may be independently instantiated to produce detected anomalies for new data when triggered, such as, e.g., when the lineage stream 230 provides the subsequent data item(s). Alternatively, the AI anomaly detection engine 216 may be independently instantiated to produce detected anomalies for new data on a periodic basis, such as, e.g., every minute, hourly, daily, weekly, biweekly, monthly, or according to any other suitable period. The detected anomalies may then be returned to one or more databases for recording detected anomalies of the storage 212. In embodiments, where the detected anomalies are maintained in the storage 212, the API request may call the detected anomalies from the storage 212 upon, e.g., administrator request for sets of the detected anomalies. Accordingly, administrators may interact with the data in the storage 212 via the API. Such interactions may include, e.g., overriding automatic designations of an anomaly or change point, override the severity or classification by the AI anomaly detection engine 216, annotate anomalies with metadata, include root cause analysis, task management tickets such as, e.g., JIRA™ tickets, links to documentation, among other modifications to the detected anomalies. Such interactions may be performed by multiple administrators at multiple computing device 220 in a collaborative fashion.

In an embodiment, such an administrator request, as well as other possible administrator requests via the GUI may have associated administrator interface (UI) requests to display the data in the selected format. Thus, the lineage-based anomaly detection system 210 may also generate a UI target group for orchestrating the lineage-based anomaly detection system 210 to produce the UI features to be returned to the computing device 220. In some embodiments, the UI features may be selected and/or customized at the computing device 220, and generated by the lineage-based anomaly detection system 210 upon the UI target group instantiation. Thus, administrators may visually explore events and anomalies in customizable views, e.g., charts and tables in the context of surrounding data items. Administrators may analyze anomalies in one variable and a set of dimensions in the context of related variables and dimensions, as well as associate events with each other. The GUI provides tools for visualizations that may be formed and returned by the lineage-based anomaly detection system 210 is organized in an administrator friendly and interpretable manner.

Figure 3:
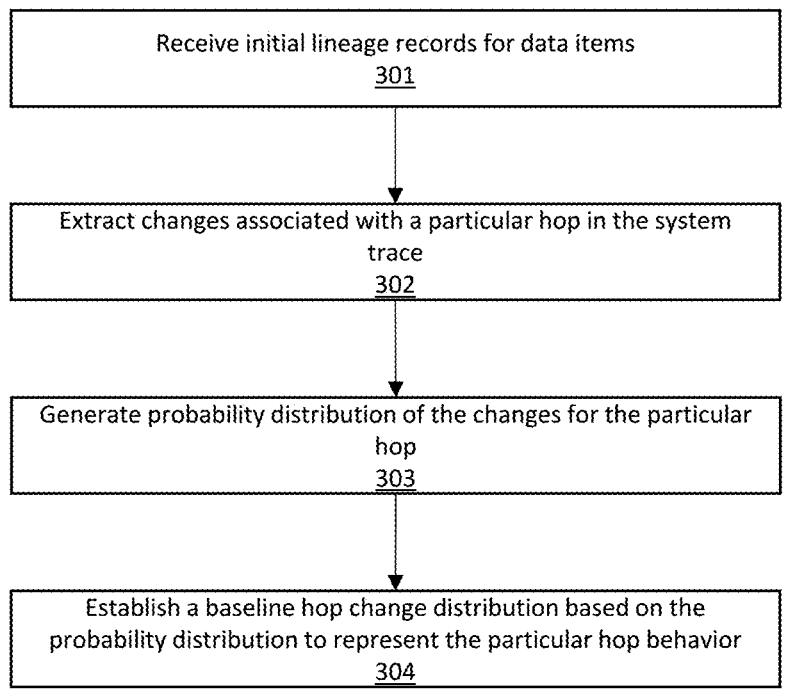
FIG. 3 depicts a flowchart for establishing a hop-specific baseline for lineage-based detection of anomalous data processors in a lineage stream in accordance with one or more embodiments of the present disclosure.

Referring to FIG. 3, a flowchart is illustrated for establishing a hop-specific baseline for lineage-based detection of anomalous data processors in a lineage stream in accordance with one or more embodiments of the present disclosure.

In some embodiments, at block 301, initial lineage records that record initial changes in data items at each data processor of a lineage stream over an initial time period are received. In some embodiments, each data processor may include a particular data processor and the initial lineage records may record the change(s) applied to each data item by each particular data processor.

In some embodiments, to log data and the changes thereof as a result of data processor operation in a lineage stream, a particular lineage stream may output one or more data items. In some embodiments, the data item(s) may include, e.g., a value, a string, a file, an object, an array, a vector, a folder, or other data structure or combination of data structures. In some embodiments, each data processor along the lineage stream (depicted in an illustrative form in FIG. 1), may apply a change to the data item(s) to transform the data item(s) as input into the data item(s) as output from the lineage stream. The change applied by each data processor along the lineage stream may be appended to a lineage record associated with the data item(s). In some embodiments, the lineage record may log a data processor identifier that identifies the data processor associated with a particular hop, the change applied by the particular hop, an indicator representative of the data item(s) before the change, an indicator representative of the data item(s) after the change, a time the change was applied, a number of changes applied, among other change-related metrics or any combination thereof.

In some embodiments, the data item(s) from the lineage stream may be received and logged to form the lineage record in a profile for each data processor and/or each lineage stream as a historical lineage record.

In some embodiments, at block 302, the changes may be extracted from each lineage record. In some embodiments, the changes from each lineage record may be used to construct a history of behavior associated with each particular data processor based on the particular changes extracted of each particular lineage record associated with each particular hop.

In some embodiments, the initial lineage records may include any suitable data structure, such as, e.g., a table, array, list, file, database object, document, etc. to store the history of data item(s) and/or changes made by the entity associated with each initial lineage record. Thus, in some embodiments, the data logging service may query the initial lineage record associated with each particular data processor in the lineage stream, and append the data item(s) and/or change(s) associated each particular data processor, e.g., based on the data processor identifier. Accordingly, the data logging service may construct a history of data item(s) and/or changes made by or otherwise associated with each data processor and/or each lineage stream.

For example, the data processors may include a sequence of Extract-Transform-Load (ETL) and/or Extract-Load-Transform (ELT) processes. Each data processor may perform a particular task to extract, transform and/or load data from a source to a target, such as filtering, cleansing, de-duplicating, validating, and authenticating the data, performing calculations, translations, or summarizations based on the raw data (e.g., changing row and column headers for consistency, converting currencies or other units of measurement, editing text strings, and more, conducting audits to ensure data quality and compliance, removing, encrypting, or protecting data governed by industry or governmental regulators, formatting the data into tables or joined tables to match the schema of the target data warehouse, among other processes or any combination thereof. In some embodiments, each transformation step may apply a change that can be quantified by one or more suitable similarity measures or other technique or any combination thereof.

Other examples of data processors may include, e.g., data analytics processes, machine learning, data normalization, API calls, among other processes that may change the data or any combination thereof. In some embodiments, the processes may include changing the data by changing the value of one or more data items. In such a case, the change may be quantified as the change in the value or the magnitude of the change in the value.

In some embodiments, at block 303, at least one historical distribution may be generated for a particular data processor based on a magnitude of each change associated with the particular data processor in each historical data item of the historical lineage records. In some embodiments, the historical distribution(s) may be any suitable probability distribution and/or probability density function to represent a continuous distribution of changes associated with expected behavior of each particular hop.

In some embodiments, a distribution generation pipeline (e.g., the distribution generation engine 115 detailed above) may access the initial lineage record associated with each data processor and/or lineage stream to analyze the data item(s) and/or change(s) represented therein. In some embodiments, the distribution generation pipeline may quantify an activity performed by each data processor for each data item. For example, for a particular data processor, the distribution generation pipeline may access, e.g., based on the data processor identifier, the initial lineage record associated with the particular data processor and extract the history of data item(s) and/or change(s). In some embodiments, each data item and/or change associated with the data processor may be quantified. For example, e.g., in an ETL and/or ELT process, each data item may include a value, set of values, vector, array, or other numerical data item for which each change may be directly represented as the magnitude of the change to one or more values of the data item. Alternatively, or in addition, each data item may include a string, e.g., alone, in a list, in an array, in a vector, or in another data structure or combination thereof, for which a quantification may be derived, e.g., as a volume of changes (e.g., number of characters changed), a magnitude of a change from a numerically encoded form of the data item, or by another quantification technique or any combination thereof.

In some embodiments, the distribution generation pipeline may use the quantified change(s) made by each data processor to establish a statistically generated baseline for each data processor. In some embodiments, to generate the baseline, the distribution generation pipeline may use the historical data item(s) and/or change(s) to fit a probability density function and/or probability distribution to the values associated therewith. In some embodiments, the probability density function may be in the form of a continuous/cumulative probability distribution.

In some embodiments, the probability distribution may include, e.g., a normal distribution, a Gaussian distribution, a log-normal distribution, a Pareto distribution, a Poisson distribution, a continuous uniform distribution, a Bernoulli distribution, a binomial distribution, a negative binomial distribution, a geometric distribution, a Chi-squared distribution, a t-distribution, an F-distribution, a beta distribution, a Gamma distribution, a Dirichlet distribution, a Wishart distribution, or other distribution or any combination thereof. In some embodiments, the probability distribution may include, e.g., a mixture distribution, a compound probability distribution, a parametric distribution, or other mixed distribution or any combination thereof.

In some embodiments, the distribution generation pipeline may train parameters of a probability distribution to create a probability density function from the parameters that represents a baseline distribution for historical (e.g., "expected") behavior of each data processor. In some embodiments, a baseline distribution may be modelled for each data processor individually to represent the expected behavior of each individual data processor. The baseline distribution approximates a true distribution of the data item(s) and/or change(s).

In some embodiments, an approximation technique may be employed to iteratively converge on probability density function parameters that is a most likely approximate of a true distribution of data item(s) and/or change(s). In some embodiments, the parameters may be updated according to, e.g., a variational inference technique, such as, e.g., a mean field algorithm, or an expectation-maximization technique, such as, e.g., maximum a posteriori estimation, or any other suitable approximation algorithm. In some embodiments, to facilitate the efficient training of the baseline distribution, the distribution generation pipeline may utilize a variational inferencing mean field to determine the probability density function of the baseline distribution based on the historical log of data item(s) and/or change(s) for a particular data processor. In some embodiments, the variational inferencing mean fields can reduce runtime in formulating the approximation of the baseline distribution from weeks to hours.

In some embodiments, at block 304, the historical distribution(s) of the particular data processor may be recorded as the baseline data processor change distribution to represent that particular data processor behavior expected for the particular hop, e.g., a particular transform in an ETL and/or ELT process or other data manipulation process. Accordingly, in some embodiments, a behavioral baseline may be quantified and output as the baseline data processor change distribution to characterize the expected non-anomalous behavior of the particular hop.

Figure 4:
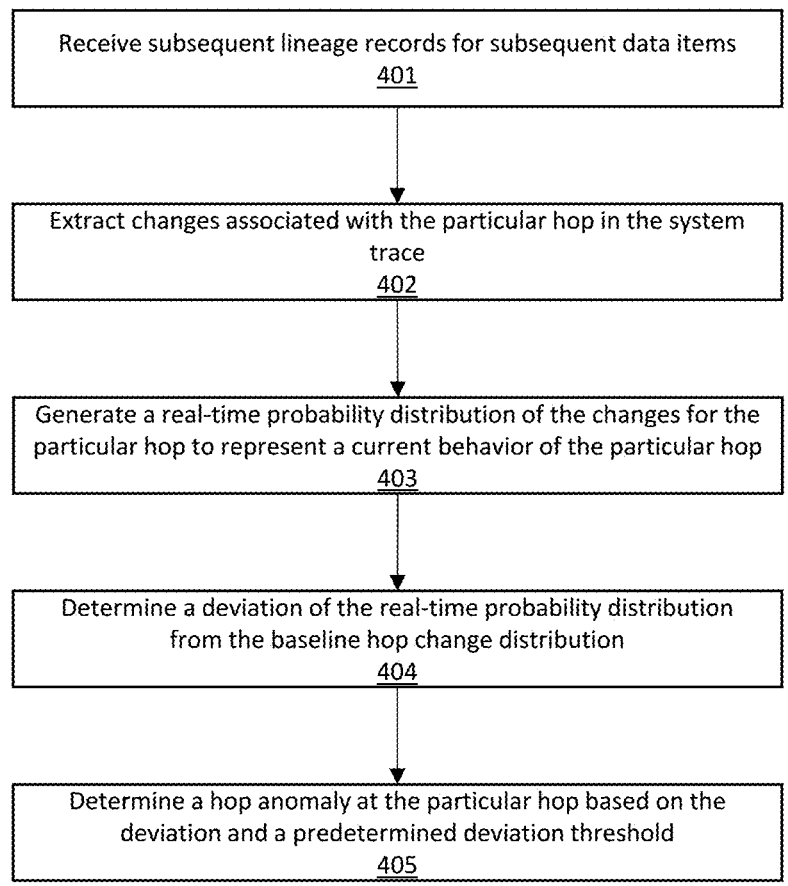
FIG. 4 depicts a flowchart for using a hop-specific baseline for lineage-based detection of anomalous data processors in a lineage stream in accordance with one or more embodiments of the present disclosure.

Referring to FIG. 4, a flowchart is illustrated for using a hop-specific baseline for lineage-based detection of anomalous data processors in a lineage stream in accordance with one or more embodiments of the present disclosure.

In some embodiments, at block 401, subsequent lineage records that record subsequent changes in data items at each data processor of a lineage stream over a subsequent time period are received. In some embodiments, each data processor may include a particular data processor and the subsequent lineage records may record the change(s) applied to each data item by each particular data processor.

In some embodiments, similar to block 301 detailed above, to log data and the changes thereof as a result of subsequent data processor operation in a lineage stream on later or subsequently processed data that is subsequent to the data of the historical lineage profile. As a result, a particular lineage stream may output one or more data items. In some embodiments, the data item(s) may include, e.g., a value, a string, a file, an object, an array, a vector, a folder, or other data structure or combination of data structures. In some embodiments, each data processor along the lineage stream (depicted in an illustrative form in FIG. 1), may apply a change to the data item(s) to transform the data item(s) as input into the data item(s) as output from the lineage stream. The change applied by each data processor along the lineage stream may be appended to a lineage record associated with the data item(s). In some embodiments, the lineage record may log a data processor identifier that identifies the data processor associated with a particular hop, the change applied by the particular hop, an indicator representative of the data item(s) before the change, an indicator representative of the data item(s) after the change, a time the change was applied, a number of changes applied, among other change-related metrics or any combination thereof.

For example, the data processors may include a sequence of Extract-Transform-Load (ETL) and/or Extract-Load-Transform (ELT) processes using new data. Each data processor may perform a particular task to extract, transform and/or load data from a source to a target, such as filtering, cleansing, de-duplicating, validating, and authenticating the data, performing calculations, translations, or summarizations based on the raw data (e.g., changing row and column headers for consistency, converting currencies or other units of measurement, editing text strings, and more, conducting audits to ensure data quality and compliance, removing, encrypting, or protecting data governed by industry or governmental regulators, formatting the data into tables or joined tables to match the schema of the target data warehouse, among other processes or any combination thereof. In some embodiments, each transformation step may apply a change that can be quantified by one or more suitable similarity measures or other technique or any combination thereof.

Other examples of data processors may include, e.g., data analytics processes, machine learning, data normalization, API calls, among other processes that may change the data or any combination thereof. In some embodiments, the processes may include changing the data by changing the value of one or more data items. In such a case, the change may be quantified as the change in the value or the magnitude of the change in the value.

In some embodiments, the subsequent data item(s) received from the lineage stream may be logged to form the subsequent lineage record for each data processor and/or each lineage stream.

In some embodiments, at block 402, the changes may be extracted from each lineage record. In some embodiments, the changes from each lineage record may be used to construct a history of behavior associated with each particular data processor based on the particular changes extracted of each particular lineage record associated with each particular hop.

In some embodiments, the subsequent lineage record may include any suitable data structure, such as, e.g., a table, array, list, file, database object, document, etc. to store the history of data item(s) and/or changes made by the entity associated with each initial lineage record. Thus, in some embodiments, the data logging service may query the initial lineage record associated with each particular data processor in the lineage stream, and append the data item(s) and/or change(s) associated each particular data processor, e.g., based on the data processor identifier. Accordingly, the data logging service may construct a history of data item(s) and/or changes made by or otherwise associated with each data processor and/or each lineage stream.

In some embodiments, at block 403, at least one real-time dynamic distribution may be generated for a particular data processor based on a magnitude of each change associated with the particular data processor in each subsequent data item of the subsequent lineage records. In some embodiments, the real-time dynamic distribution(s) may be any suitable probability distribution and/or probability density function to represent a continuous distribution of changes associated with a current behavior of each particular hop.

In some embodiments, a distribution generation pipeline (e.g., the distribution generation engine 115 detailed above) may access the real-time lineage record associated with each data processor and/or lineage stream to analyze the data item(s) and/or change(s) represented therein. In some embodiments, the distribution generation pipeline may quantify an activity performed by each data processor for each data item. For example, for a particular data processor, the distribution generation pipeline may access, e.g., based on the data processor identifier, the real-time lineage record associated with the particular data processor and extract the history of data item(s) and/or change(s). In some embodiments, each data item and/or change associated with the data processor may be quantified. For example, e.g., in an ETL and/or ELT process, each data item may include a value, set of values, vector, array, or other numerical data item for which each change may be directly represented as the magnitude of the change to one or more values of the data item. Alternatively, or in addition, each data item may include a string, e.g., alone, in a list, in an array, in a vector, or in another data structure or combination thereof, for which a quantification may be derived, e.g., as a volume of changes (e.g., number of characters changed), a magnitude of a change from a numerically encoded form of the data item, or by another quantification technique or any combination thereof.

In some embodiments, the distribution generation pipeline may use the quantified change(s) made by each data processor to establish a statistically generated baseline for each data processor as the subsequent data is received and the changes evaluated so as to produce a real-time baseline for the data processors of the lineage stream. In some embodiments, to generate the baseline, the distribution generation pipeline may use the historical data item(s) and/or change(s) to fit a probability density function and/or probability distribution to the values associated therewith. In some embodiments, the probability density function may be in the form of a continuous/cumulative probability distribution.

In some embodiments, the probability distribution may include, e.g., a normal distribution, a Gaussian distribution, a log-normal distribution, a Pareto distribution, a Poisson distribution, a continuous uniform distribution, a Bernoulli distribution, a binomial distribution, a negative binomial distribution, a geometric distribution, a Chi-squared distribution, a t-distribution, an F-distribution, a beta distribution, a Gamma distribution, a Dirichlet distribution, a Wishart distribution, or other distribution or any combination thereof. In some embodiments, the probability distribution may include, e.g., a mixture distribution, a compound probability distribution, a parametric distribution, or other mixed distribution or any combination thereof.

In some embodiments, at block 404, a deviation between the data processor baseline and the current data processor behavior may be determined based on the at least one historical distribution and the real-time dynamic distribution. In some embodiments, the deviation may include a magnitude difference between at least one parameter of the historical distribution and at least one corresponding parameter of the real-time dynamic distribution. For example, the deviation may include a difference between the mean or expected value of the historical distribution and the mean or expected value of the real-time dynamic distribution, between the standard deviation of the historical distribution and the standard deviation of the real-time dynamic distribution, or between any other parameter or any combination thereof. Thus, the deviation may represent a change to the operation of a particular data processor, such as a particular transformation applied by the ETL and/or ELT process, which may be indicative of an anomalous behavior such as an error, fault, corruption or other problem.

In some embodiments, at block 405, at least one data processor anomaly may be identified for the particular data processor based at least in part on the deviation and a predetermined deviation threshold. As a result, a malfunctioning data processor in the lineage stream, such as a data processor experiencing an error, fault, corruption or other problem, may be pin-pointed to the particular data processor within the lineage stream, such as a particular transformation in the ETL and/or ELT processor, a particular analytical step in a data analytics pipeline, a particular API call in a chain of API calls, among others or any combination thereof.

Figure 5:
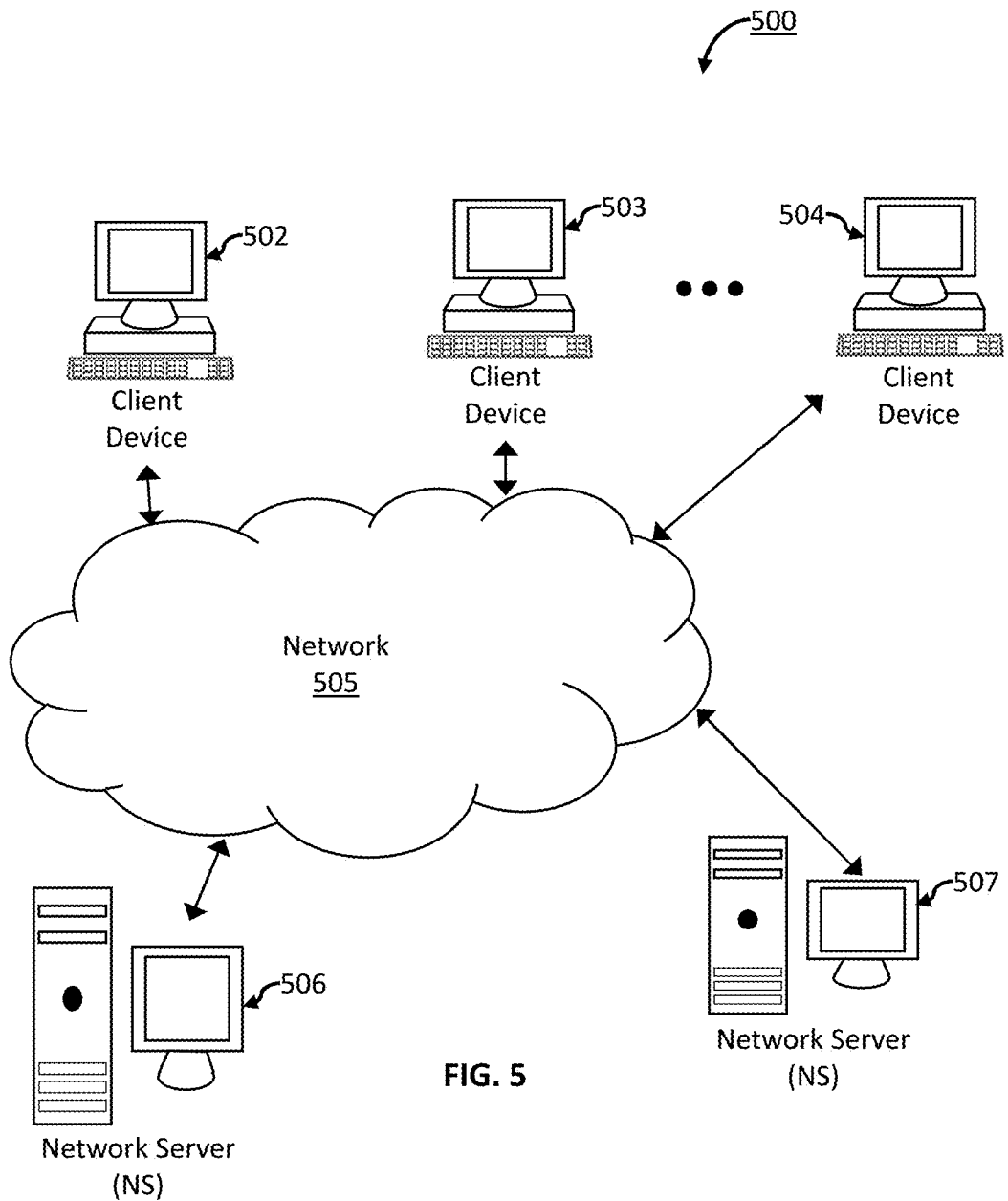
FIG. 5 depicts a block diagram of an exemplary computer-based system and platform for lineage-based detection of anomalous data processors in accordance with one or more embodiments of the present disclosure.

FIG. 5 depicts a block diagram of an exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, client device 502, client device 503 through client device 504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the client devices 502 through 504 may be personal computers, multiprocessor systems, microprocessor-based or programmable consumer electronics, network PCs, and the like. In some embodiments, one or more client devices within client devices 502 through 504 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more client devices within client devices 502 through 504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 502 through 504 may include may run one or more applications, such as Internet browsers, mobile applications, voice calls, video games, videoconferencing, and email, among others. In some embodiments, one or more client devices within client devices 502 through 504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 502 through 504 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 502 through 504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Apache on Linux or Microsoft IIS (Internet Information Services). In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 502 through 504.

In some embodiments and, optionally, in combination of any embodiment described above or below, for example, one or more exemplary computing client devices 502 through 504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 6:
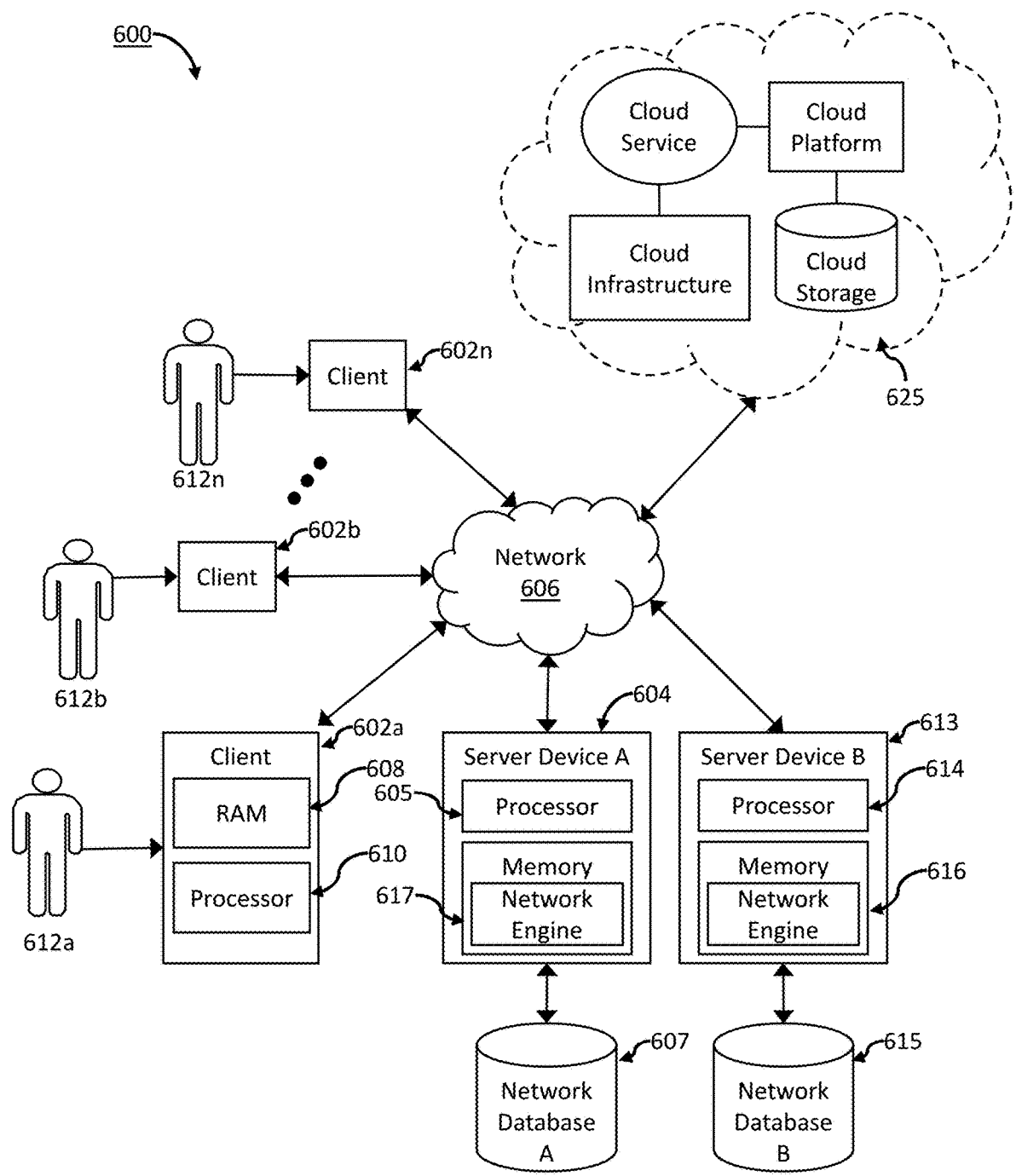
FIG. 6 depicts a block diagram of another exemplary computer-based system and platform for lineage-based detection of anomalous data processors in accordance with one or more embodiments of the present disclosure.

FIG. 6 depicts a block diagram of another exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client device 602a, client device 602b through client device 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client device 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 602a through 602n may also comprise a number of external or internal devices such as a mouse, a CD-ROM, DVD, a physical or virtual keyboard, a display, or other input or output devices. In some embodiments, examples of client devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, client devices 602a through 602n may be specifically programmed with one or more application programs in accordance with one or more principles/methodologies detailed herein. In some embodiments, client devices 602a through 602n may operate on any operating system capable of supporting a browser or browser-enabled application, such as Microsoft™, Windows™, and/or Linux. In some embodiments, client devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, user 612a, user 612b through user 612n, may communicate over the exemplary network 606 with each other and/or with other systems and/or devices coupled to the network 606. As shown in FIG. 6, exemplary server devices 604 and 613 may include processor 605 and processor 614, respectively, as well as memory 617 and memory 616, respectively. In some embodiments, the server devices 604 and 613 may be also coupled to the network 606. In some embodiments, one or more client devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
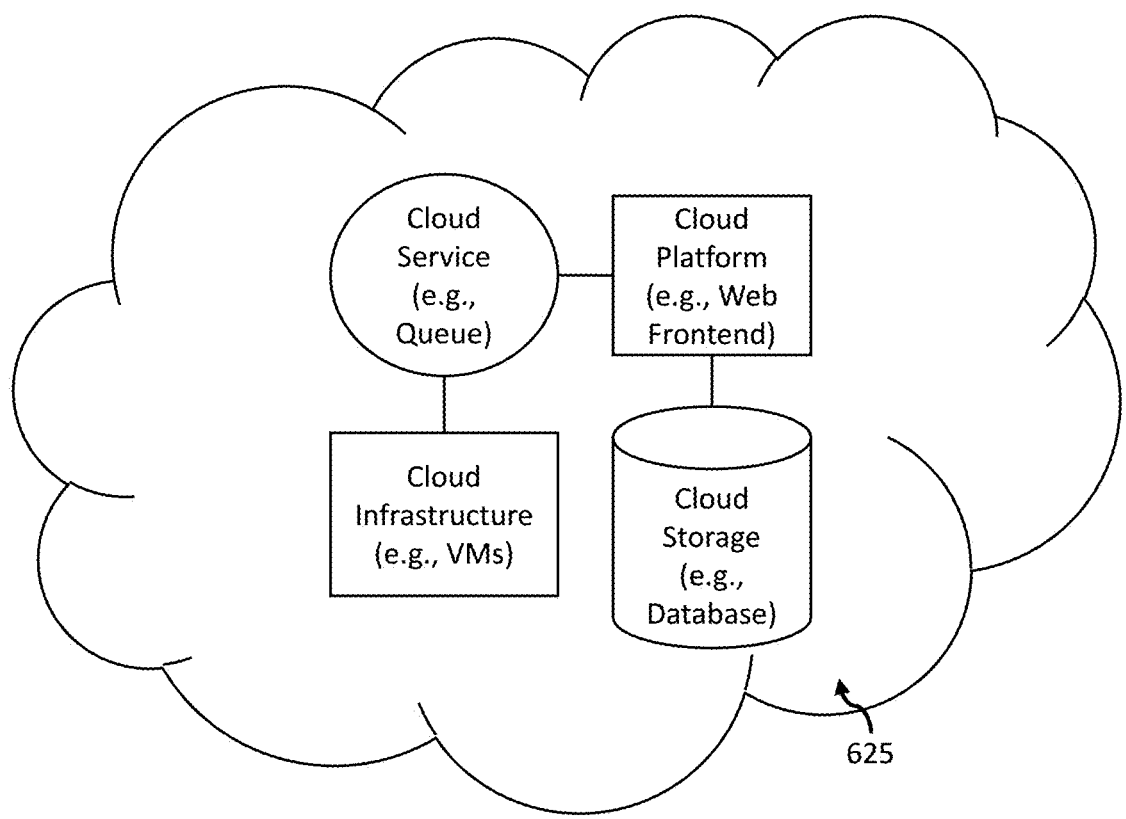
FIG. 7 depicts illustrative schematics of an exemplary implementation of the cloud computing/architecture(s) in which embodiments of a system for lineage-based detection of anomalous data processors may be specifically configured to operate in accordance with some embodiments of the present disclosure.
Figure 8:
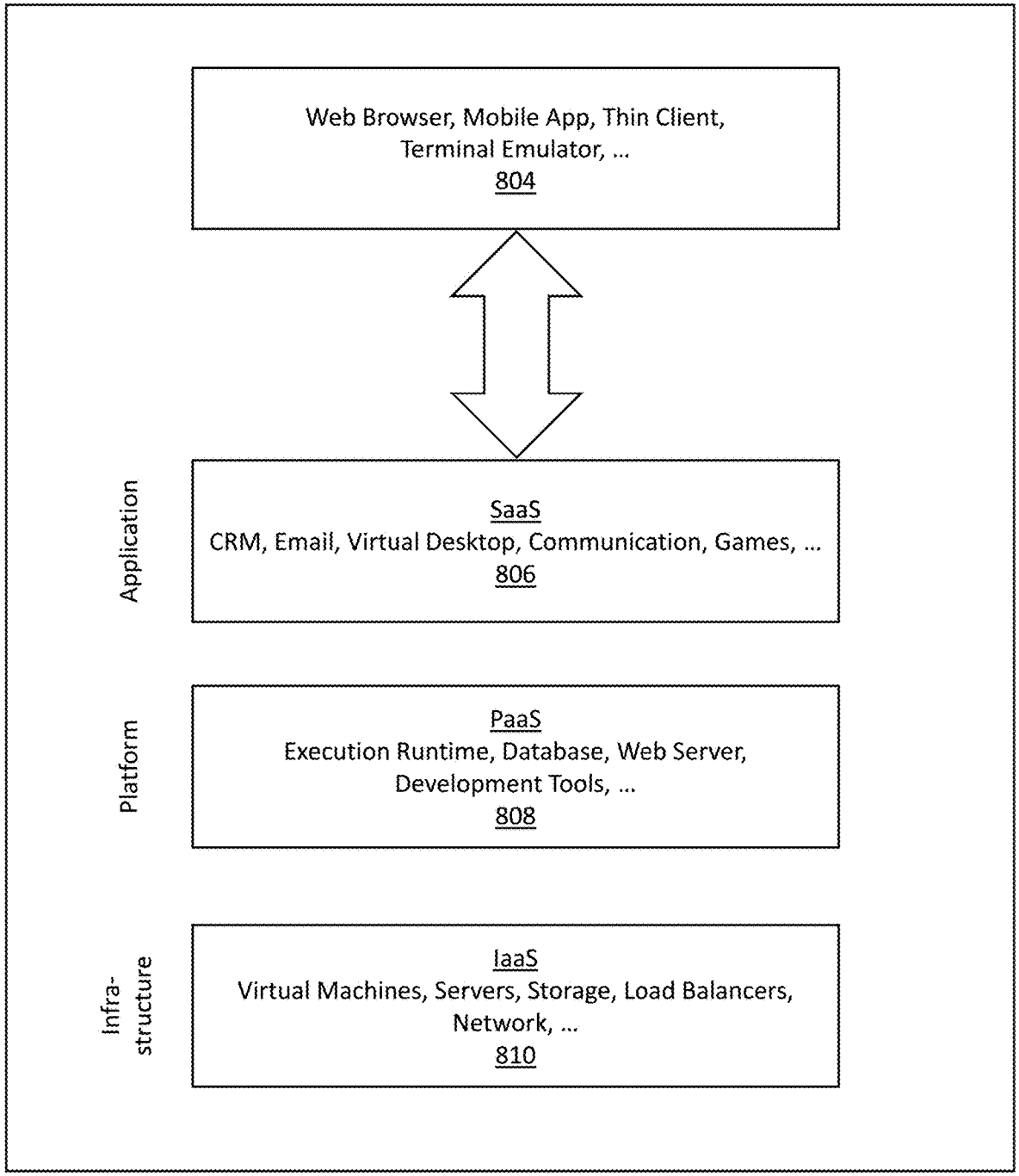
FIG. 8 depicts illustrative schematics of another exemplary implementation of the cloud computing/architecture(s) in which embodiments of a system for lineage-based detection of anomalous data processors may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 625 such as, but not limiting to: infrastructure a service (IaaS) 810, platform as a service (PaaS) 808, and/or software as a service (SaaS) 806 using a web browser, mobile app, thin client, terminal emulator or other endpoint 804. FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data items, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method including: receiving, by at least one processor, in real time, a plurality of initial lineage records that records a plurality of initial changes in a plurality of data items at each data processor of a plurality of data processors of a lineage stream over an initial time period; where the plurality of data processors relate to a plurality of processes performed on the plurality of data items during the initial time period; generating, by the at least one processor, at least one historical distribution as a data processor baseline for a particular data processor in the plurality of data processors based on a magnitude of each change associated with the particular data processor in each historical data item of a plurality of historical lineage records; receiving, by at least one processor, in real time, a plurality of lineage records that records a plurality of subsequent changes in the plurality of data items at each data processor of the plurality of data processors of the lineage stream over a subsequent time period; generating, by the at least one processor, a real-time dynamic distribution to represent a current data processor behavior for the particular data processor in the plurality of data processors based on the magnitude of each change associated with the particular data processor in each data item of the plurality of subsequent lineage records; determining, by the at least one processor, a deviation between the data processor baseline and the current data processor behavior based on the at least one historical distribution and the real-time dynamic distribution; determining, by the at least one processor, at least one data processor anomaly associated with the particular data processor based at least in part on the deviation and a predetermined deviation threshold; and generating, by the at least one processor, a user interface (UI) depicting a map of the lineage stream, where the UI is configured to label at least one data processor as the at least one data processor anomaly in the map so as to allow at least one action to affect the at least one data processor anomaly.

Clause 2. The method as recited in clause 1, where the plurality of data processors is specific to the lineage stream.

Clause 3. The method as recited in clause 1, where the plurality of data processors is shared across a plurality of lineage streams; and where the at least one historical distribution is associated with the particular data processor for the lineage stream.

Clause 4. The method as recited in clause 1, further including: generating, by the at least one processor, at least one change quantification for each initial change of the plurality of initial changes based at least in part on a numerical encoding of at least one character in the plurality of data items.

Clause 5. The method as recited in clause 1, where the plurality of initial lineage records is recorded in metadata of the plurality of data items.

Clause 6. The method as recited in clause 1, further including: generating, by the at least one processor, the real-time dynamic distribution to represent the current data processor behavior for the particular data processor in the plurality of data processors based on the plurality of subsequent lineage records associated with a current period of time; where the current period of time includes a most recent day.

Clause 7. The method as recited in clause 1, where the at least one historical distribution includes at least one Gaussian distribution.

Clause 8. The method as recited in clause 7, where the at least one Gaussian distribution includes a compound Gaussian distribution.

Clause 9. A system including: at least one processor in communication with a non-transitory computer readable medium having software instructions stored thereon, where the at least one processor, upon execution of the software instructions, is configured to: receive in real time, a plurality of initial lineage records that records a plurality of initial changes in a plurality of data items at each data processor of a plurality of data processors of a lineage stream over an initial time period; where the plurality of data processors relate to a plurality of processes performed on the plurality of data items during the initial time period; generate at least one historical distribution as a data processor baseline for a particular data processor in the plurality of data processors based on a magnitude of each change associated with the particular data processor in each historical data item of a plurality of historical lineage records; receive in real time, a plurality of lineage records that records a plurality of subsequent changes in the plurality of data items at each data processor of the plurality of data processors of the lineage stream over a subsequent time period; generate a real-time dynamic distribution to represent a current data processor behavior for the particular data processor in the plurality of data processors based on the magnitude of each change associated with the particular data processor in each data item of the plurality of subsequent lineage records; determine a deviation between the data processor baseline and the current data processor behavior based on the at least one historical distribution and the real-time dynamic distribution; determine at least one data processor anomaly associated with the particular data processor based at least in part on the deviation and a predetermined deviation threshold; and generate a user interface (UI) depicting a map of the lineage stream, where the UI is configured to label at least one data processor as the at least one data processor anomaly in the map so as to allow at least one action to affect the at least one data processor anomaly.

Clause 10. The system as recited in clause 9, where the plurality of data processors is specific to the lineage stream.

Clause 11. The system as recited in clause 9, where the plurality of data processors is shared across a plurality of lineage streams; and where the at least one historical distribution is associated with the particular data processor for the lineage stream.

Clause 12. The system as recited in clause 9, where the at least one processor, upon execution of the software instructions, is further configured to: generate at least one change quantification for each initial change of the plurality of initial changes based at least in part on a numerical encoding of at least one character in the plurality of data items.

Clause 13. The system as recited in clause 9, where the plurality of initial lineage records is recorded in metadata of the plurality of data items.

Clause 14. The system as recited in clause 9, where the at least one processor, upon execution of the software instructions, is further configured to: generate the real-time dynamic distribution to represent the current data processor behavior for the particular data processor in the plurality of data processors based on the plurality of subsequent lineage records associated with a current period of time; where the current period of time includes a most recent day.

Clause 15. The system as recited in clause 9, where the at least one historical distribution includes at least one Gaussian distribution.

Clause 16. The system as recited in clause 15, where the at least one Gaussian distribution includes a compound Gaussian distribution.

Clause 17. A method including: receiving, by at least one processor, in real time, a plurality of initial lineage records that records a plurality of initial changes in a plurality of data items at each data processor of a plurality of data processors of a lineage stream over an initial time period; where the plurality of data processors relate to a plurality of processes performed on the plurality of data items during the initial time period; training, by the at least one processor, at least one baseline machine learning model for a particular data processor in the plurality of data processors based on a magnitude of each change associated with the particular data processor in each historical data item of a plurality of historical lineage records and an annotation associated with each historical data item indicative of whether each historical data item is anomalous; receiving, by at least one processor, in real time, a plurality of lineage records that records a plurality of subsequent changes in the plurality of data items at each data processor of the plurality of data processors of the lineage stream over a subsequent time period; inputting, by the at least one processor, the plurality of subsequent changes associated with the particular data into the at least one baseline machine learning model to cause a plurality of parameters of the at least one baseline machine learning model to output a probability of anomalous behavior of the particular data processor; determining, by the at least one processor, at least one data processor anomaly associated with the particular data processor based at least in part on the probability and a predetermined probability threshold; and generating, by the at least one processor, a user interface (UI) depicting a map of the lineage stream, where the UI is configured to label at least one data processor as the at least one data processor anomaly in the map so as to allow at least one action to affect the at least one data processor anomaly.

Clause 18. The method as recited in clause 17, where the plurality of data processors is specific to the lineage stream.

Clause 19. The method as recited in clause 17, where the plurality of data processors is shared across a plurality of lineage streams; and where the at least one baseline machine learning model is associated with the particular data processor for the lineage stream.

Clause 20. The method as recited in clause 17, further including: generating, by the at least one processor, at least one change quantification for each initial change of the plurality of initial changes based at least in part on a numerical encoding of at least one character in the plurality of data items.includPublications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
receiving, by at least one processor, in real time, a plurality of initial lineage records that records a plurality of initial changes in a plurality of data items at each data processor of a plurality of data processors of a lineage stream over an initial time period;
wherein the plurality of data processors relate to a plurality of processes performed on the plurality of data items during the initial time period;
generating, by the at least one processor, at least one historical distribution as a data processor baseline for a particular data processor in the plurality of data processors based on a magnitude of each change associated with the particular data processor in each historical data item of a plurality of historical lineage records;
receiving, by at least one processor, in real time, a plurality of lineage records that records a plurality of subsequent changes in the plurality of data items at each data processor of the plurality of data processors of the lineage stream over a subsequent time period;
generating, by the at least one processor, a real-time dynamic distribution to represent a current data processor behavior for the particular data processor in the plurality of data processors based on the magnitude of each change associated with the particular data processor in each historical data item of the plurality of subsequent lineage records;
determining, by the at least one processor, a deviation between the data processor baseline and the current data processor behavior based on the at least one historical distribution and the real-time dynamic distribution;
determining, by the at least one processor, at least one data processor anomaly associated with the particular data processor based at least in part on the deviation and a predetermined deviation threshold; and
generating, by the at least one processor, a user interface (UI) depicting a map of the lineage stream, wherein the UI is configured to label at least one data processor as the at least one data processor anomaly in the map so as to allow at least one action to affect the at least one data processor anomaly.

2. The method as recited in claim 1, wherein the plurality of data processors is specific to the lineage stream.

3. The method as recited in claim 1, wherein the plurality of data processors is shared across a plurality of lineage streams; and
wherein the at least one historical distribution is associated with the particular data processor for the lineage stream.

4. The method as recited in claim 1, further comprising:
generating, by the at least one processor, at least one change quantification for each initial change of the plurality of initial changes based at least in part on a numerical encoding of at least one character in the plurality of data items.

5. The method as recited in claim 1, wherein the plurality of initial lineage records is recorded in metadata of the plurality of data items.

6. The method as recited in claim 1, further comprising:
generating, by the at least one processor, the real-time dynamic distribution to represent the current data processor behavior for the particular data processor in the plurality of data processors based on the plurality of subsequent lineage records associated with a current period of time;
wherein the current period of time comprises a most recent day.

7. The method as recited in claim 1, wherein the at least one historical distribution comprises at least one Gaussian distribution.

8. The method as recited in claim 7, wherein the at least one Gaussian distribution comprises a compound Gaussian distribution.

9. A system comprising:
at least one processor in communication with a non-transitory computer readable medium having software instructions stored thereon, wherein the at least one processor, upon execution of the software instructions, is configured to:
receive in real time, a plurality of initial lineage records that records a plurality of initial changes in a plurality of data items at each data processor of a plurality of data processors of a lineage stream over an initial time period;
wherein the plurality of data processors relate to a plurality of processes performed on the plurality of data items during the initial time period;
generate at least one historical distribution as a data processor baseline for a particular data processor in the plurality of data processors based on a magnitude of each change associated with the particular data processor in each historical data item of a plurality of historical lineage records;
receive in real time, a plurality of lineage records that records a plurality of subsequent changes in the plurality of data items at each data processor of the plurality of data processors of the lineage stream over a subsequent time period;

generate a real-time dynamic distribution to represent a current data processor behavior for the particular data processor in the plurality of data processors based on the magnitude of each change associated with the particular data processor in each data item of the plurality of subsequent lineage records;

determine a deviation between the data processor baseline and the current data processor behavior based on the at least one historical distribution and the real-time dynamic distribution;

determine at least one data processor anomaly associated with the particular data processor based at least in part on the deviation and a predetermined deviation threshold; and generate a user interface (UI) depicting a map of the lineage stream, wherein the UI is configured to label at least one data processor as the at least one data processor anomaly in the map so as to allow at least one action to affect the at least one data processor anomaly.

10. The system as recited in claim 9, wherein the plurality of data processors is specific to the lineage stream.

11. The system as recited in claim 9, wherein the plurality of data processors is shared across a plurality of lineage streams; and wherein the at least one historical distribution is associated with the particular data processor for the lineage stream.

12. The system as recited in claim 9, wherein the at least one processor, upon execution of the software instructions, is further configured to:

generate at least one change quantification for each initial change of the plurality of initial changes based at least in part on a numerical encoding of at least one character in the plurality of data items.

13. The system as recited in claim 9, wherein the plurality of initial lineage records is recorded in metadata of the plurality of data items.

14. The system as recited in claim 9, wherein the at least one processor, upon execution of the software instructions, is further configured to:

generate the real-time dynamic distribution to represent the current data processor behavior for the particular data processor in the plurality of data processors based on the plurality of subsequent lineage records associated with a current period of time;

wherein the current period of time comprises a most recent day.

15. The system as recited in claim 9, wherein the at least one historical distribution comprises at least one Gaussian distribution.

16. The system as recited in claim 15, wherein the at least one Gaussian distribution comprises a compound Gaussian distribution.

17. A method comprising:

receiving, by at least one processor, in real time, a plurality of initial lineage records that records a plurality of initial changes in a plurality of data items at each data processor of a plurality of data processors of a lineage stream over an initial time period;

wherein the plurality of data processors relate to a plurality of processes performed on the plurality of data items during the initial time period;

training, by the at least one processor, at least one baseline machine learning model for a particular data processor in the plurality of data processors based on a magnitude of each change associated with the particular data processor in each historical data item of a plurality of historical lineage records and an annotation associated with each historical data item indicative of whether each historical data item is anomalous;

receiving, by at least one processor, in real time, a plurality of lineage records that records a plurality of subsequent changes in the plurality of data items at each data processor of the plurality of data processors of the lineage stream over a subsequent time period;

inputting, by the at least one processor, the plurality of subsequent changes associated with the particular data into the at least one baseline machine learning model to cause a plurality of parameters of the at least one baseline machine learning model to output a probability of anomalous behavior of the particular data processor;

determining, by the at least one processor, at least one data processor anomaly associated with the particular data processor based at least in part on the probability and a predetermined probability threshold; and generating, by the at least one processor, a user interface (UI) depicting a map of the lineage stream, wherein the UI is configured to label at least one data processor as the at least one data processor anomaly in the map so as to allow at least one action to affect the at least one data processor anomaly.

18. The method as recited in claim 17, wherein the plurality of data processors is specific to the lineage stream.

19. The method as recited in claim 17, wherein the plurality of data processors is shared across a plurality of lineage streams; and wherein the at least one baseline machine learning model is associated with the particular data processor for the lineage stream.

20. The method as recited in claim 17, further comprising:

generating, by the at least one processor, at least one change quantification for each initial change of the plurality of initial changes based at least in part on a numerical encoding of at least one character in the plurality of data items.

* * * * *